United States Patent
Yazawa

(10) Patent No.: US 7,359,148 B2
(45) Date of Patent: Apr. 15, 2008

(54) THIN FILM MAGNETIC HEAD INCLUDING NIPRE ALLOY GAP LAYER

(75) Inventor: Hisayuki Yazawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 613 days.

(21) Appl. No.: 10/916,029

(22) Filed: Aug. 11, 2004

(65) Prior Publication Data

US 2005/0034789 A1    Feb. 17, 2005

(30) Foreign Application Priority Data

Aug. 13, 2003  (JP)  .............................. 2003-292840

(51) Int. Cl.
*G11B 1/147*   (2006.01)
(52) U.S. Cl. .................. 360/126; 360/119; 360/120
(58) Field of Classification Search ................ None
See application file for complete search history.

(56) References Cited

U.S. PATENT DOCUMENTS

| | | | | |
|---|---|---|---|---|
| 5,316,844 A | * | 5/1994 | Suzuki et al. ............... | 428/323 |
| 5,389,398 A | * | 2/1995 | Suzuki et al. ............... | 427/130 |
| 2002/0071207 A1 | * | 6/2002 | Kanada et al. .............. | 360/126 |
| 2002/0145824 A1 | * | 10/2002 | Tabakovic et al. .......... | 360/126 |
| 2004/0097173 A1 | * | 5/2004 | Crawforth et al. ............ | 451/41 |
| 2004/0103523 A1 | * | 6/2004 | Yamada .................. | 29/603.01 |
| 2005/0036237 A1 | * | 2/2005 | Yazawa et al. ............. | 360/126 |

FOREIGN PATENT DOCUMENTS

| | | |
|---|---|---|
| EP | 88111983.8 | 1/1989 |
| GB | 2 189 257 | 10/1987 |
| JP | 5-335314 | 12/1993 |
| JP | 6-36233 | 2/1994 |
| JP | 11-213332 | 8/1999 |
| JP | 2002-298310 | 10/2002 |
| JP | 2002-353222 | 12/2002 |

OTHER PUBLICATIONS

Search Report dated Nov. 18, 2004 for British Patent Application No. 0415736.8.

* cited by examiner

*Primary Examiner*—John P. Sheehan
(74) *Attorney, Agent, or Firm*—Brinks Hofer Gilson & Lione

(57) ABSTRACT

It is an object to provide a thin film magnetic head capable of improving characteristics and properties required of a gap layer by, in particular, appropriately controlling the compositional ratio of a NiPRe alloy used as the gap layer. A NiPRe alloy which has excellent chemical agent resistance, which maintains excellently a non-magnetic state even when heated at a high temperature, and which can suppress the element diffusion at the interface to a magnetic pole layer can be formed through plating by controlling the compositional ratio of the NiPRe alloy used as a gap layer at within the range enclosed by boundary lines A to E in a ternary diagram.

20 Claims, 16 Drawing Sheets

AFTER LAMINATION PLATING
Ni/P/Re = 76.5/12.2/11.3
(percent by mass)

AFTER HEAT TREATMENT
Ni/P/Re = 77.2/11.9/10.9
(percent by mass)

AFTER LAMINATION PLATING
Ni/P/Re = 62.5/8.8/28.7
(percent by mass)

AFTER HEAT TREATMENT
Ni/P/Re = 63.7/7.3/29.0
(percent by mass)

AFTER LAMINATION PLATING
Ni/P/Re = 50.3/7.0/42.7 (percent by mass)

AFTER HEAT TREATMENT
Ni/P/Re = 53.6/5.8/40.6 (percent by mass)

AFTER LAMINATION PLATING
Ni/P/Re = 47.5/5.1/47.4 (percent by mass)

AFTER HEAT TREATMENT
Ni/P/Re = 58.9/3.7/37.4 (percent by mass)

THIN FILM MAGNETIC HEAD INCLUDING NIPRE ALLOY GAP LAYER

This application claims priority to Japanese Patent Application No.:2003-292840, filed on Aug. 13, 2003 which is incorporated herein by reference.

FIELD OF THE INVENTION

The present application may relate to a thin film magnetic head for recording. In particular, it may relate to a thin film magnetic head, wherein when a gap layer is formed from a NiPRe alloy.

BACKGROUND

In Japanese Unexamined Patent Application Publication No. 2002-298310, a NiP alloy or a NiPW alloy is used as a gap layer. The NiP alloy or the NiPW alloy can be formed through plating, and three layers of a lower magnetic pole layer 21, a gap layer 22, and an upper magnetic pole layer 35 shown in the patent document can be continuously formed through plating, so that the miniaturization of a magnetic pole portion can be advanced further. As shown in FIG. 18, the etching rate of the NiPW alloy can be reduced to about 15 nm/Hr when the compositional ratio of the element W is 10 to 20 percent by mass. When the element W is controlled at about 48 percent by mass, the etching rate of the NiW alloy becomes about 25 nm/Hr. However, the NiPW alloy was a material which readily caused problems when used as the gap.

Japanese Unexamined Patent Application Publication No. 11-213332 discloses a metal film made of Re or the like or an alloy primarily composed of this metal film serving as a gap layer. No specific composition nor compositional ratio of the alloy prepared to contain Re is disclosed and, therefore, it is not clear whether the alloy film actually has the characteristics and properties desired in a gap layer.

Japanese Unexamined Patent Application Publication No. 2002-353222 discloses that a NiP—Re alloy is used as a barrier film of a thin film transistor, although this is not in the technical field of the thin film magnetic head. The content of Re is 50 to 75 percent. However, it was evident from the experiments described below that when the content of Re was this high, undesirable element diffusion readily occurred, particularly due to a heat treatment.

Japanese Unexamined Patent Application Publication No. 5-335314 discloses a Re-containing nickel alloy as a material used for one section of a semiconductor element.

Examples of characteristics and properties desired of a gap layer of a thin film magnetic head include non-magnetism, reduced element diffusion at the interface to a magnetic layer, and chemical agent resistance.

As a result of the experiments conducted by the present inventor, it was determined that the NiP alloy, was susceptible to an alkaline aqueous solution used in the slider processing and the like, and problems of elution and the like occurred when the NiP alloy was exposed to the alkaline aqueous solution. When the NiP alloy serving as a gap layer is eluted and, thereby, a space and the like are left behind, problems occur in that, for example, magnetic pole layers disposed on and under the gap layer are corroded from within the space, and become susceptible to damage during sliding on a recording medium. Therefore, it is desirable that the material used for the gap layer is resistant to the alkaline aqueous solution.

The NiP alloy becomes non-magnetic by appropriately controlling the compositional ratio of the element P. According to the experiments conducted by the present inventor, it was determined that the NiP alloy took on the magnetism after being heat-treated at 200° C. unless at least about 16 percent by mass of element P was contained. A heating step may be used in the process for manufacturing the thin film magnetic head, and it is desirable that the non-magnetism is maintained after a heat treatment is performed at about 200° C. or more.

It is known that the element P can be contained in an alloy at about 18 percent by mass at the maximum. As a result, in order to appropriately achieve the non-magnetization of the NiP alloy, the content of the element P must be controlled within a very narrow allowable range.

SUMMARY

The present application addresses a thin film magnetic head having characteristics and properties which may desirable in a gap layer, by appropriately controlling the compositional ratio of a NiPRe alloy used as the gap layer.

In an aspect, a thin film magnetic head includes a magnetic pole portion disposed in the side of a surface facing a recording medium, a magnetic circuit construction portion for leading a recording magnetic field to the magnetic pole portion, and a coil layer for inducing the recording magnetic field. The magnetic pole portion may be composed of at least a gap layer and an upper magnetic pole layer disposed on the gap layer, wherein the gap layer is formed from a NiPRe alloy for example, by plating. As shown in ternary diagrams (FIGS. 4 and 5), the compositional ratio of the NiPRe alloy is within the range enclosed by a linear boundary line A (including the boundary line A) connecting the point a (Ni:P:Re)=(84 percent by mass:16 percent by mass:0 percent by mass) and the point b (Ni:P:Re)=(72 percent by mass:0 percent by mass:28 percent by mass); a linear boundary line B (including the boundary line B) representing that the compositional ratio of Re is 2 percent by mass; a linear boundary line C (including the boundary line C) representing that the compositional ratio of Re is 46 percent by mass; a linear boundary line D (including the boundary line D) representing that the compositional ratio of P is 4 percent by mass; and a linear boundary line E (including the boundary line E) representing that the compositional ratio of P is 18 percent by mass.

According to the experimental results described below, when the NiPRe alloy formed through plating had a composition within the range, the non-magnetic state was maintained, chemical agent resistance was exhibited, and the element diffusion at the interface to the magnetic pole layer was resistant to occurring even with heat treatment.

In an aspect, the boundary line F (including the boundary line F) is defined as a straight line connecting the point c (Ni:P:Re)=(20 percent by mass:0 percent by mass:80 percent by mass) and the point d (Ni:P:Re)=(82 percent by mass:18 percent by mass:0 percent by mass) in the ternary diagrams shown in FIG. 4 and FIG. 5, and the compositional ratio of the NiPRe alloy is within the range enclosed by the boundary lines A, B, C, D, and F.

In another aspect, the compositional ratio of the P is at least 8 percent by mass. With this composition, the chemical agent resistance can be improved and, in addition, the non-magnetic state may be maintained even when heating at a high temperature.

In a further aspect, the compositional ratio of Re is at least 10 percent by mass. With this composition, the chemical agent resistance can be improved. In yet another aspect, the compositional ratio of Re is 30 percent by mass or less, and the element diffusion at the interface to the magnetic pole layer may be reduced.

The compositional ratio of the NiPRe alloy used as the gap layer may be appropriately controlled and a NiPRe alloy having chemical agent resistance, which maintains the non-magnetic state even when heated at a high temperature, and which may suppress diffusion at the interface to the magnetic pole layer can be formed through plating.

DETAILED DESCRIPTION

Exemplary embodiments of the invention may be better understood with reference to the drawings, but these embodiments are not intended to be of a limiting nature. Rather, the invention is to cover all modifications, equivalents, and alternatives falling within the spirit and scope of the invention which is set forth by the claims.

Figure 1:
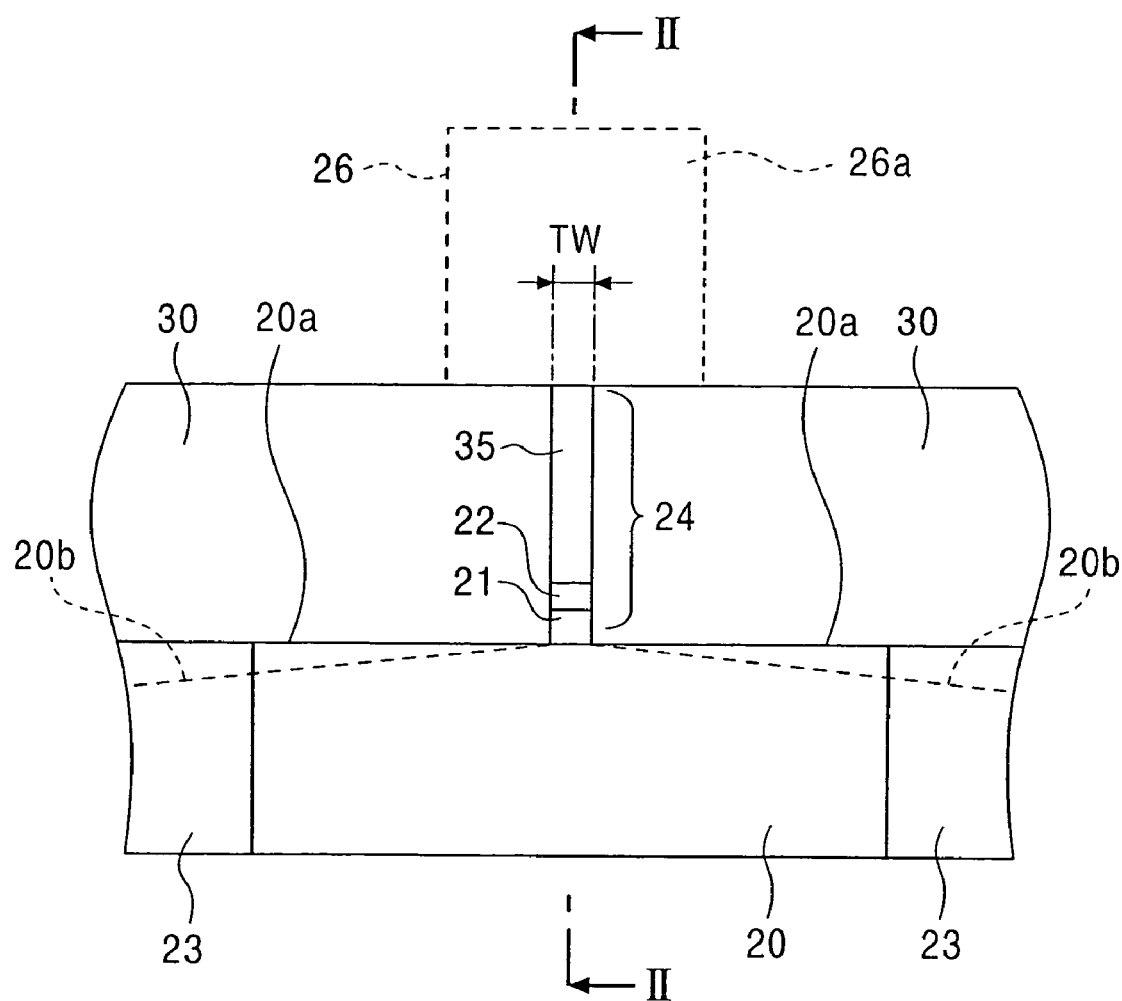
FIG. 1 is a front view showing a thin film magnetic head according to a first example.
Figure 2:
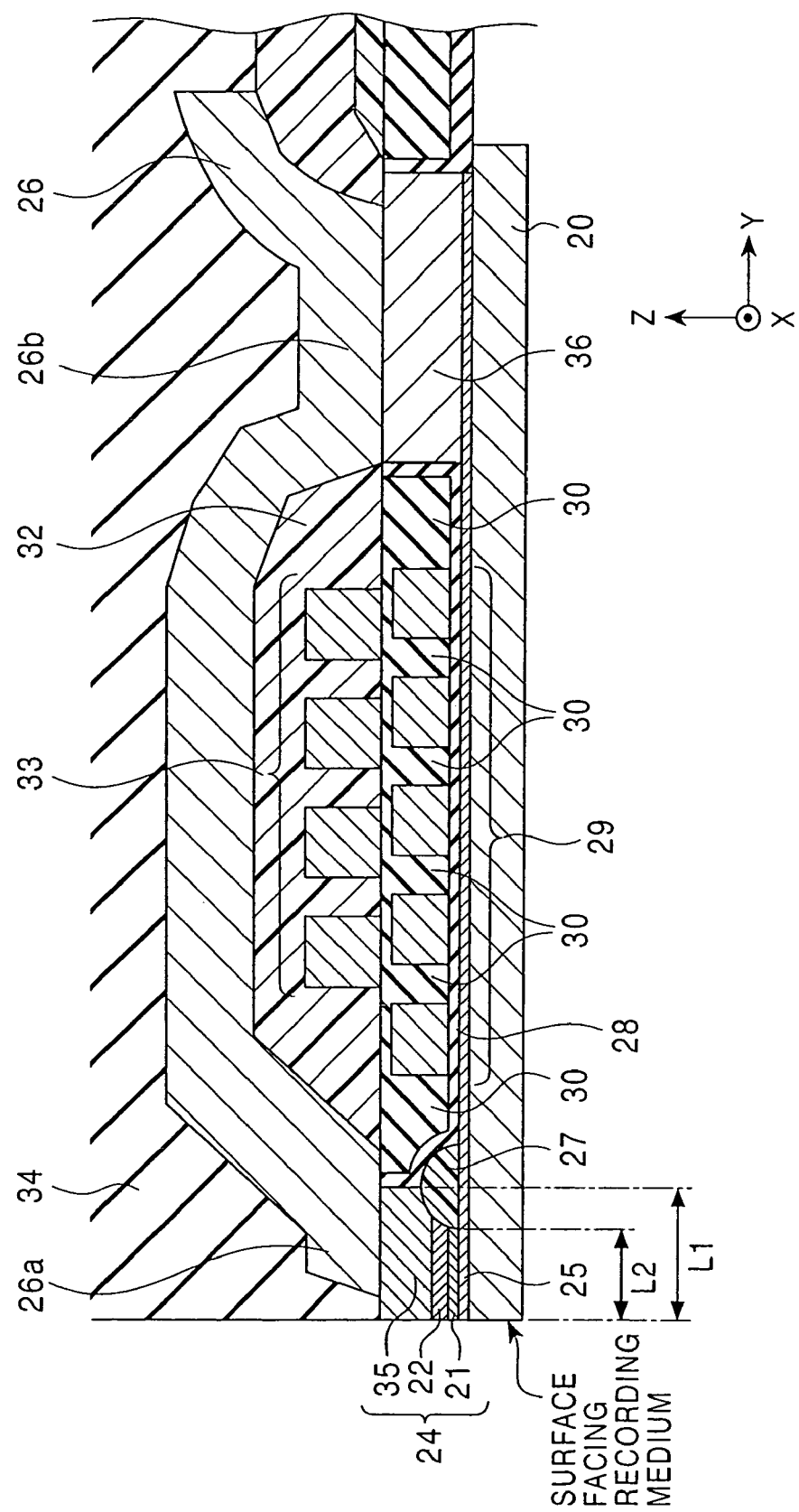
FIG. 2 is a partial sectional view of the section indicated by a line II-II of the thin film magnetic head shown in FIG. 1.

Like numbered elements in the same or different drawings perform equivalent functions FIG. 1 is a partial front view showing the structure of a thin film magnetic head. FIG. 2 is a partial sectional view of the section taken along a line II-II of the thin film magnetic head shown in FIG. 1, viewed from the direction indicated by arrows.

The thin film magnetic head shown in FIG. 1 is an inductive head for recording. A playback head through the use of a magnetoresistance effect (an MR head through the use of so-called AMR, GMR, TMR, or the like) may be laminated under this inductive head.

A lower core layer 20 is formed from a magnetic material, e.g., a NiFe alloy, a CoFe alloy, or a CoFeNi alloy. When the playback head is laminated under the lower core layer 20, a shield layer may be disposed separately from the lower core layer 20 in order to protect a magnetoresistance effect element against electrical noise. Alternatively, the shield layer is not present, and the lower core layer 20 may serve the function as an upper shield layer of the playback head.

Insulating layers 23 are formed on both sides of the lower core layer 20. The top surface 20a of the lower core layer 20 may be formed to extend from the base end of the lower magnetic pole layer 21 in the direction parallel to the track-width direction (the X direction shown in the drawing), or inclined surfaces 20b and 20b inclining in a direction farther from the upper core layer 26 may be formed. The occurrence of side fringing can be appropriately reduced by disposing the inclined surfaces 20b and 20b on the top surface of the lower core layer 20.

A magnetic pole portion 24 is formed on the lower core layer 20, and the magnetic pole portion 24 is formed to be exposed at a surface facing a recording medium. In an aspect, the magnetic pole portion 24 is formed to have a track width TW, and is a sort of track-width regulation portion. The track width TW may be 0.7 μm or less, and more preferably may be 0.5 μm or less.

The magnetic pole portion 24 may be configured to have a laminated structure composed of the lower magnetic pole layer 21, a gap layer 22, and an upper magnetic pole layer 35.

The lower magnetic pole layer 21 to become a bottom layer of the magnetic pole portion 24 is formed through plating on the lower core layer 20 with a plating substrate layer 25 (refer to FIG. 2) therebetween. The lower magnetic pole layer 21 is magnetically connected to the lower core layer 20, and the lower magnetic pole layer 21 may be formed from either the same material as or a material different from that of the lower core layer 20. The lower magnetic pole layer 21 is formed by the use of a magnetic material, e.g., a NiFe alloy, a CoFe alloy, or a CoFeNi alloy. The lower magnetic pole layer 21 may be formed from either a single-layer film or a multilayer film. The plating substrate layer 25 may not be present.

The non-magnetic gap layer 22 is laminated on the lower magnetic pole layer 21. The gap layer 22 is formed through plating on the lower magnetic pole layer 21.

The upper magnetic pole layer 35 magnetically connected to an upper core layer 26 described below is formed through plating on the gap layer 22. The upper magnetic pole layer 35 may be formed from either the same material as or a material different from that of the upper core layer 26. The upper magnetic pole layer 35 is formed by the use of a magnetic material, e.g., a NiFe alloy, a CoFe alloy, or a CoFeNi alloy. The upper magnetic pole layer 35 may be formed from either a single-layer film or a multilayer film.

In another aspect, the magnetic pole portion 24 may be formed from a laminated film composed of the gap layer 22 and the upper magnetic pole layer 35.

As shown in FIG. 2, the magnetic pole portion 24 may be disposed from the surface facing the recording medium (ABS surface) toward the height direction (the Y direction shown in the drawing) to have a length dimension of L1. A gap depth(Gd)-determining layer 27 formed from, for example, an organic insulating material is disposed between the magnetic pole portion 24 and the lower core layer 20. The distance from the end of the Gd-determining layer 27 to the surface facing the recording medium is made to be L2, and this distance L2 is a gap depth (Gd).

At the rear of the magnetic pole portion 24 in the height direction (the Y direction shown in the drawing), a coil layer 29 is disposed by helical winding on the lower core layer 20 with an insulating substrate layer 28 therebetween. Preferably, the insulating substrate layer 28 is formed from an insulating material, e.g., Al$_2$O$_3$ or SiO$_2$.

Spaces between conductor portions of the coil layer 29 are filled in with an insulating layer 30. The insulating layer 30 is formed by combining an organic insulating material and an inorganic insulating material, e.g., Al$_2$O$_3$, and is configured such that the inorganic insulating material is exposed at the surface facing the recording medium.

As shown in FIG. 1, the insulating layer 30 is disposed in both sides of the magnetic pole portion 24 in the track-width direction (the X direction shown in the drawing), and the insulating layer 30 is formed to be exposed at the surface facing the recording medium.

As shown in FIG. 2, a second coil layer 33 is disposed by helical winding on the insulating layer 30.

The second coil layer 33 is covered with an insulating layer 32 formed from an organic material, e.g., a resist or a polyimide, and the upper core layer 26 formed from a NiFe alloy or the like is disposed on the insulating layer 32 by patterning through the use of a frame plating method or the like.

An end portion 26a of the upper core layer 26 is formed to be magnetically connected to the upper magnetic pole layer 35, and a base end portion 26b of the upper core layer 26 is formed to be magnetically connected to a lifting layer 36 formed from a magnetic material, e.g., a NiFe alloy, on the lower core layer 20. The lifting layer 36 may not be present, and in this case, the base end portion 26b of the upper core layer 26 may be directly connected to the lower core layer 20. The upper core layer 26 is covered with a protective layer 34 made of Al$_2$O$_3$ or the like.

In the thin film magnetic head shown in FIG. 1 and FIG. 2, "a magnetic circuit construction portion for leading a recording magnetic field to the magnetic pole portion" is the lower core layer 20, the lifting layer 36, and the upper core layer 26.

In one aspect, the gap layer 22 may be formed from a NiPRe alloy; the layer may be formed through plating. In the NiPRe alloy, the element P and the element Re may serve the function of smoothly making the alloy amorphous. However, for example, a NiRe alloy readily crystallizes, and even the NiPRe alloy may crystallize depending on the compositional ratio of the element P and the element Re. The crystallization is not preferable since, for example, the chemical agent resistance against an alkaline aqueous solution is reduced, and a state in which the magnetism is readily taken on is brought about.

On the other hand, even when the NiPRe alloy is amorphous, the chemical agent resistance, the magnetization and the interface diffusion may depend on the compositional ratio of the element P and the element Re.

As a result of various experiments conducted as described below, the an appropriate range of compositional ratios was determined where the NiPRe alloy can be brought into an amorphous state. A NiPRe alloy having characteristics and properties desired of a gap layer can be produced, wherein, for example, chemical agent resistance against an alkaline aqueous solution is exhibited, the non-magnetic state may be maintained even after a heat treatment is performed, and the element diffusion at the interface to the lower magnetic pole layer 21 and the upper magnetic pole layer 35 can be suppressed during the heating.

Figure 4:
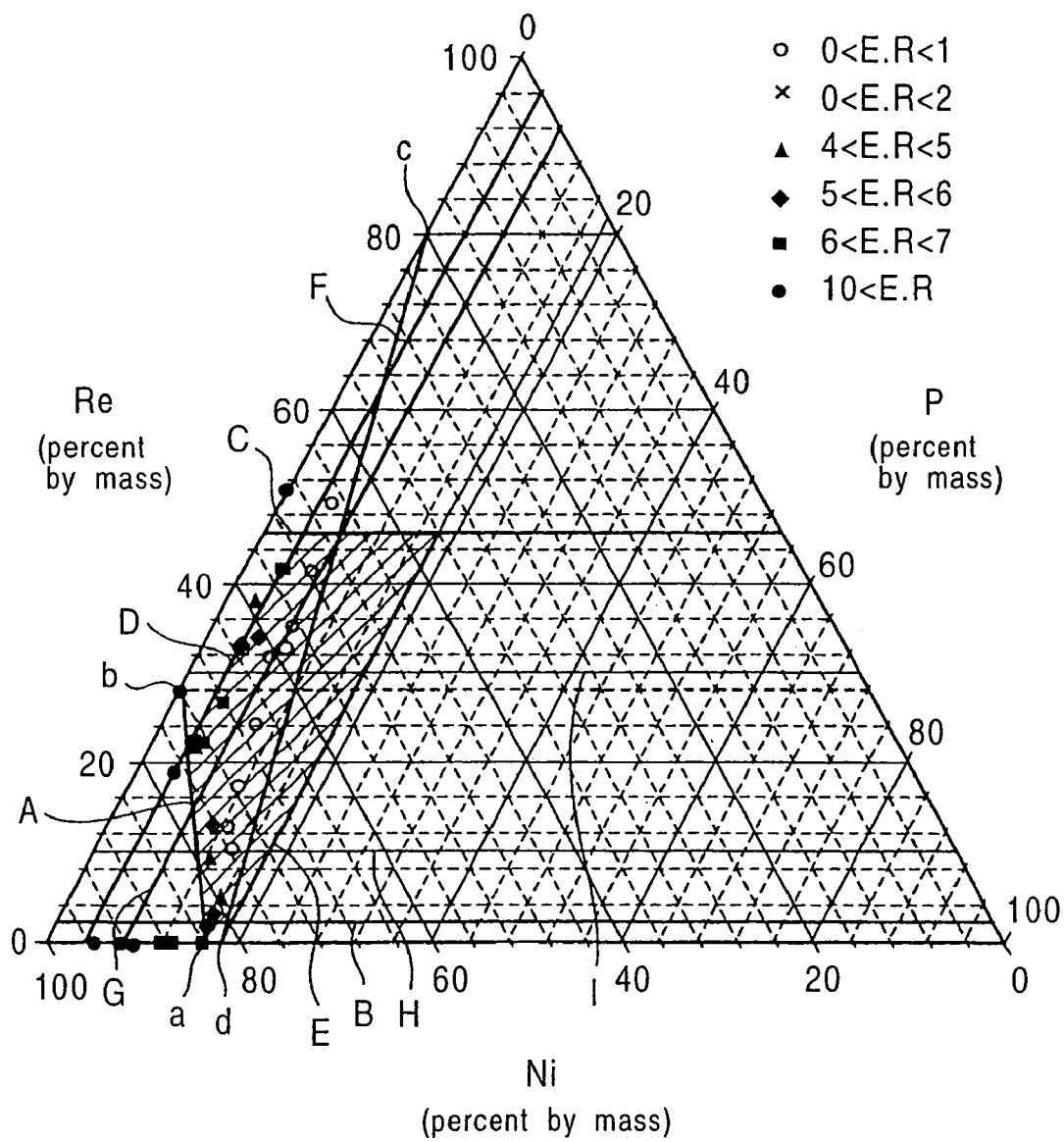
FIG. 4 is a ternary diagram showing the relationship between the compositional ratio of a NiPRe alloy and the etching rate with respect to an alkaline aqueous solution.
Figure 5:
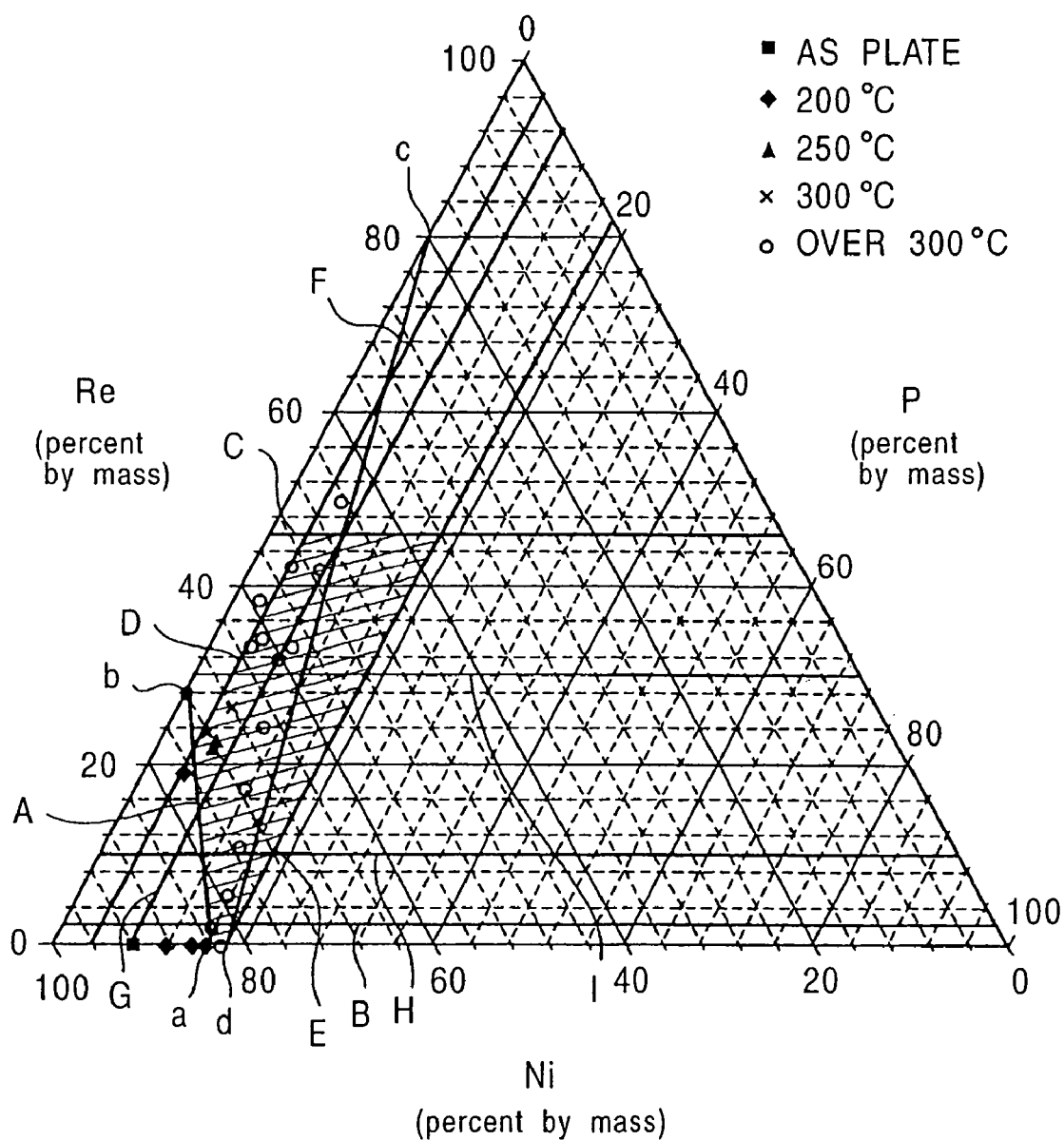
FIG. 5 is a ternary diagram showing the relationship between the compositional ratio of a NiPRe alloy and the heat resistance.

The range of the compositional ratio of the NiPRe alloy may be specified based on the ternary diagrams shown in FIG. 4 and FIG. 5.

FIG. 4 and FIG. 5 are ternary diagrams in which the base is an axis indicating the compositional ratio of the element Ni, the left side is an axis indicating the compositional ratio of the element Re, and the right side is an axis indicating the compositional ratio of the element P. The axis indicating the compositional ratio of the element Ni increases from 0 percent by mass to 100 percent by mass from the right toward the left in the drawing. The axis indicating the compositional ratio of the element Re increases from 0 percent by mass to 100 percent by mass from the bottom toward the top in the drawing. The axis indicating the compositional ratio of the element P increases from 0 percent by mass to 100 percent by mass from the top toward the bottom in the drawing.

The ternary diagram shown in FIG. 4 represents experimental results of etching rates (E.R) with respect to an alkaline aqueous solution, and the unit of etching rate is nm/Hr. As the etching rate becomes smaller, the chemical agent resistance may improve. An aqueous solution composed of polyoxyethylene nonylphenyl ether and the like was used as the alkaline aqueous solution in the experiment shown in FIG. 4.

The ternary diagram shown in FIG. 5 represents experimental results related to the heat resistance. In the present application, "to have excellent heat resistance" refers to that the non-magnetic state can be maintained after a treatment is performed at a certain heating temperature, and "to have poor heat resistance" refers to the situation where the magnetism is taken on after a treatment is performed at a certain heating temperature. Hereinafter, "heat resistance" refers to that described above unless otherwise specified.

The compositional ratio point belonging to "as Plate" in the ternary diagram shown in FIG. 5 refers to a compositional ratio at which "magnetism" was taken on in the non-heating state. Likewise, compositional ratio points belonging to "200° C.", "250° C.", and "300° C." in the ternary diagram refer to compositional ratios at which "magnetism" was taken on after heat treatments were performed at respective temperatures. On the other hand, compositional ratio points belonging to "Over 300° C." in the ternary diagram refer to compositional ratios at which "magnetism" was not taken on and "non-magnetism" was exhibited after the heat treatment was performed at 300° C.

In an aspect, the NiPRe alloy used for the gap layer 22 is in a non-magnetic state under the condition of being heated, particularly even under the condition of being heated at about 200° C. and has excellent corrosion resistance against an alkaline aqueous solution, and furthermore, the element diffusion at the interface to the lower magnetic pole layer 21 and the upper magnetic pole layer 35 does not occur during the heating. The compositional ratio having the characteristics and properties was determined by the experiments described below, and as a result, the following compositional range was able to be determined.

In the ternary diagrams shown in FIG. 4 and FIG. 5, the compositional ratio of the NiPRe alloy of the present invention is within the range enclosed by a linear boundary line A (including the boundary line A) connecting the point a (Ni:P:Re)=(84 percent by mass:16 percent by mass:0 percent by mass) and the point b (Ni:P:Re)=(72 percent by mass:0 percent by mass:28 percent by mass); a linear boundary line B (including the boundary line B) representing that the compositional ratio of Re is 2 percent by mass; a linear boundary line C (including the boundary line C) representing that the compositional ratio of Re is 46 percent by mass; a linear boundary line D (including the boundary line D) representing that the compositional ratio of P is 4 percent by mass; and a linear boundary line E (including the boundary line E) representing that the compositional ratio of P is 18 percent by mass.

The characteristics of the boundary line A will be described. The NiPRe alloy takes on "magnetism" under the condition of being heated at about 200° C. in the compositional ratio region in the left side of the boundary line A (not including the boundary line A) in the ternary diagrams shown in FIG. 4 and FIG. 5. On the other hand, the NiPRe alloy may be in the non-magnetic state even under the condition of being heated at about 200° C. in the compositional ratio region in the rightside of the boundary line A (including the boundary line A).

The compositional ratio region in the left side of the boundary line A is a region in which both the compositional ratios of the element Re and the element P become lower as the position is changed obliquely in the lower-left direction.

The NiP alloy becomes non-magnetic even after a heat treatment is performed at 200° C. when about 16 percent by mass of element P is contained. In the case of the NiPRe alloy, even when the content of the element P is less than about 16 percent by mass, the NiPRe alloy becomes non-magnetic as long as Re is contained to some extent. However, in the compositional ratio region in the left side of the boundary line A, an amorphous state may not brought about, and the NiPRe alloy in the compositional ratio region in the left side of the boundary line A takes on the magnetism at a heating temperature of about 200° C.

The boundary line B shown is a boundary line specifying a lower limit value of the element Re, and it that when at least 2 percent by mass of the Re was contained, the non-magnetic state was able to be maintained after the heat treatment was performed.

The boundary line C shown is a boundary line specifying an upper limit value of the element Re, and that when the Re was controlled at 46 percent by mass or less, the element diffusion during the heating at the interface to the lower magnetic pole layer 21 and the upper magnetic pole layer 35 was able to be suppressed.

The boundary line D shown in FIG. 4 and FIG. 5 is a boundary line specifying a lower limit value of the element P, and even when the content of the element P was reduced to about 4 percent by mass, within the compositional ratio range enclosed by the boundary lines A to E, conversely, the element Re was able to be increased and, thereby, the heat resistance and the corrosion resistance was able to be improved.

The boundary line E is a boundary line specifying an upper limit value of the element P. This boundary (the element P is 18 percent by mass or less) is a maximum value of the allowable content of the element P in the NiPRe alloy.

As shown in FIG. 4, within the compositional range enclosed by the boundary lines A to E, the etching rate with respect to the alkaline aqueous solution can be reduced to less than 7 nm/Hr, and the etching rate can be made lower than that of the NiP alloy previously used as a gap layer.

In particular, within the compositional range enclosed by the boundary lines A to E, when the compositional ratios of Ni, P and Re are further limited, the etching rate with respect to the alkaline aqueous solution may be reduced, and the etching rate may be reduced to less than 2 nm/Hr.

As shown in FIG. 5, within the compositional range enclosed by the boundary lines A to E, the non-magnetic state can be maintained even at a heating temperature of about 200° C., and the heat resistance may be improved even when the application range of the compositional ratio is extended compared with that of the NiP alloy previously used as a gap layer.

In an aspect, the compositional ratio range may be enclosed by the boundary lines A to E, as described below.

In the ternary diagrams shown in FIG. 4 and FIG. 5, the boundary line F (including the boundary line F) is defined as a straight line bonding the point c (Ni:P:Re)=(20 percent by mass:0 percent by mass:80 percent by mass) and the point d (Ni:P:Re)=(82 percent by mass:18 percent by mass:0 percent by mass), and the compositional ratio of the NiPRe alloy is within the range enclosed by the boundary lines A, B, C, D, and F.

As shown in FIG. 4, the boundary line F is a straight line located immediately to the right of compositional ratio points represented by circles indicating that the etching rate with respect to the alkaline aqueous solution is more than 0 nm/Hr and less than 1 nm/Hr. In the compositional range which is the compositional ratio region in the left side of this boundary line F (including the boundary line F) and which is enclosed by the boundary lines A, B, C, and D as well as the boundary line F, the etching rate with respect to the alkaline aqueous solution can be further reduced. From the ternary diagram related to the heat resistance shown in FIG. 5, within the range enclosed by the boundary lines A, B, C, D, and F, the non-magnetic state can be maintained even after a heat treatment is performed at about 200° C.

In an aspect, the compositional ratio of the element P may be at least 8 percent by mass. That is, in the ternary diagrams shown in FIG. 4 and FIG. 5, the boundary line D (the line indicating that the compositional ratio of the element P is 4 percent by mass), which is one of the boundary lines regulating the range of the compositional ratio, is replaced with a boundary line G.

In this manner, the compositional ratios at which the etching rate with respect to the alkaline aqueous solution is more than 6 nm/Hr and less than 7 nm/Hr may be excluded and, thereby, the etching rate may be reduced to a value less than 6 nm/Hr.

The compositional ratios at which the magnetism is taken on at 250° C. are excluded and, thereby, a NiPRe alloy which maintains the non-magnetic state even after a heat treatment is performed at about 300° C. can be produced.

In an aspect, the compositional ratio of the element Re is at least 10 percent by mass. In the ternary diagrams shown in FIG. 4 and FIG. 5, the boundary line B (the line indicating that the compositional ratio of the element Re is 2 percent by mass), which is one of the boundary lines regulating the range of the compositional ratio, is replaced with a boundary line H. In this manner, the majority of the compositional ratios at which the etching rate is more than 4 nm/Hr and less than 6 nm/Hr may not included within the range of the compositional ratio of the NiPRe alloy and, thereby, the chemical agent resistance against the alkaline aqueous solution may be improved.

In another aspect, the compositional ratio of the element Re is 30 percent by mass or less. In the ternary diagrams shown in FIG. 4 and FIG. 5, the boundary line C (the line indicating that the compositional ratio of the element Re is 46 percent by mass), which is one of the boundary lines regulating the range of the compositional ratio, is replaced with a boundary line I. In this manner, according to the experiments described below, the element diffusion during the heating at the interface to the lower magnetic pole layer 21 and the upper magnetic pole layer 35 may be suppressed.

Figure 3A:
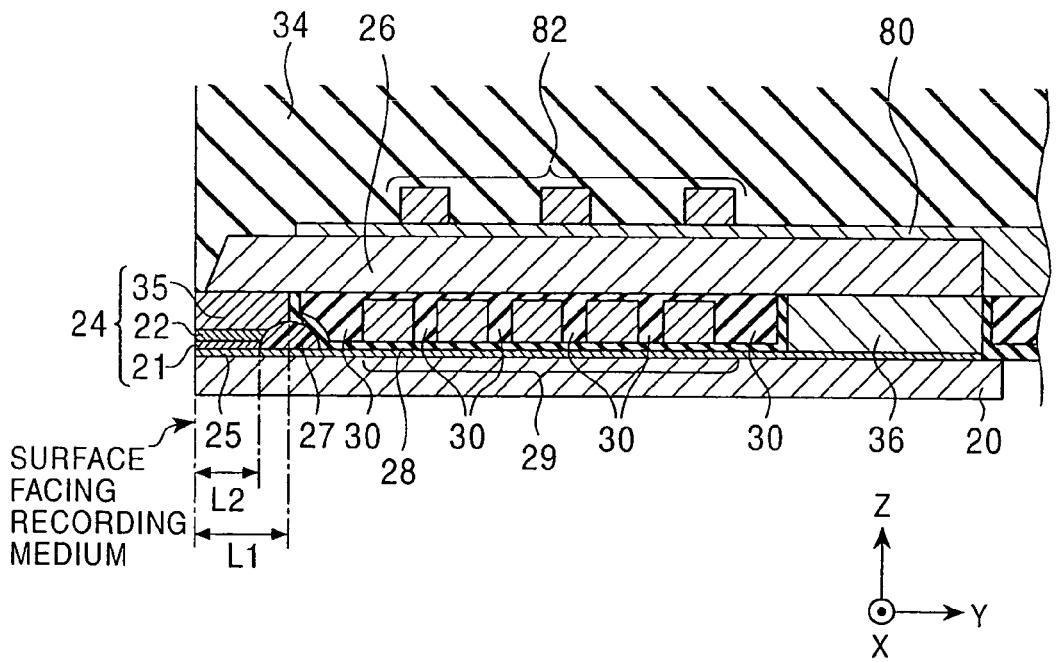
FIG. 3A is a partial sectional view of a thin film magnetic head according to a second example.

FIG. 3A shows a modified example of the thin film magnetic head shown in FIG. 2. A plurality of first coil pieces 81 formed from an electrically conductive material are disposed on the plating insulating substrate layer 28. The top surface of the insulating layer 30 covering the first coil pieces 81 is flush with the top surface of the upper magnetic pole layer 35, and the upper core layer 26 is disposed over the upper magnetic pole layer 35 and the insulating layer 30.

An insulating layer 80 formed from an insulating material, e.g., a resist, is disposed on the upper core layer 26. The insulating layer 80 is formed from an organic insulating material. A plurality of second coil pieces 82 formed from an electrically conductive material are disposed on the insulating layer 80.

The end portions in the track-width direction of the first coil pieces 81 and the second coil pieces 82 are electrically connected with each other to form a toroidal coil layer from the first coil pieces 81 and the second coil pieces 82.

Figure 3B:
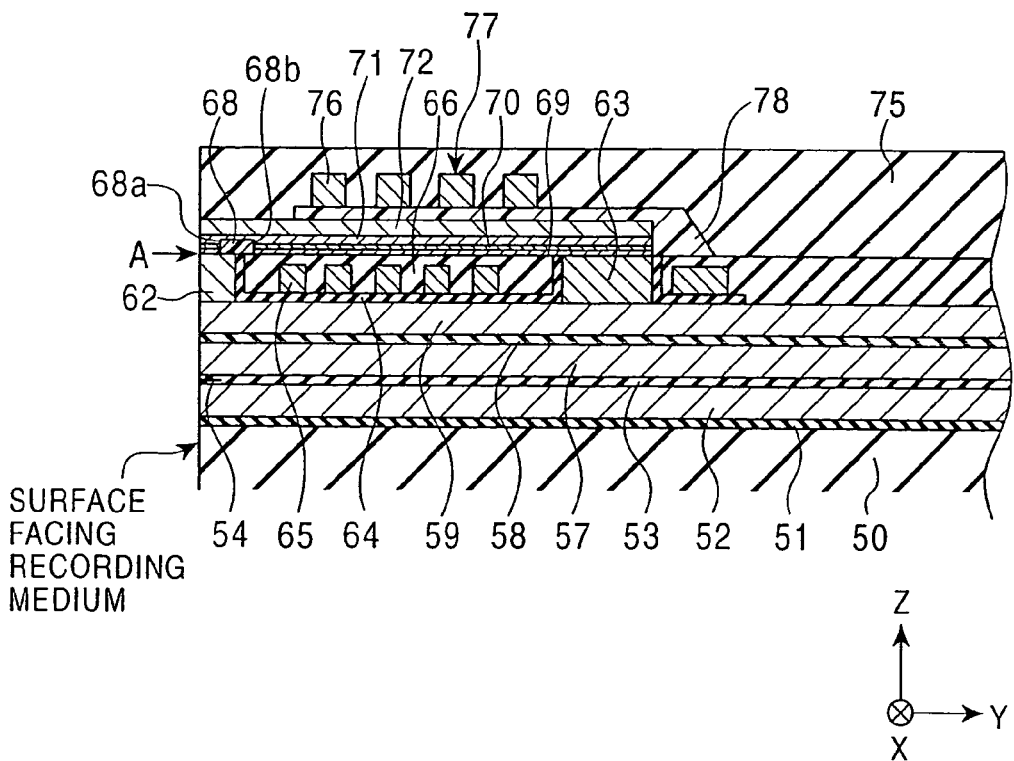
FIG. 3B is a partial sectional view of a thin film magnetic head according to a third example.

FIG. 3B is a partial vertical sectional view of a thin film magnetic head having a structure different from the thin film magnetic head shown in FIG. 1 to FIG. 3A.

A slider 50 is formed from alumina titanium carbide ($Al_2O_3$—TiC) or the like, and an $Al_2O_3$ layer 51 is disposed on the slider 50.

A lower shield layer 52 formed from a NiFe-based alloy, sendust, or the like is disposed on the $Al_2O_3$ layer 51, and a gap layer 53 composed of a lower gap layer and an upper gap layer formed from $Al_2O_3$ or the like is disposed on the lower shield layer 52.

A magnetoresistance effect element 54 typified by a GMR element, e.g., a spin valve type thin film element, is disposed in the gap layer 53, and the front end surface of the magnetoresistance effect element 54 is exposed at the surface facing the recording medium. An upper shield layer 57 formed from a NiFe-based alloy or the like is disposed on the gap layer 53.

As shown in FIG. 3B, a separation layer 58 formed from $Al_2O_3$ or the like is disposed on the upper shield layer 57. A lower core layer 59 is disposed on the separation layer 58.

On the lower core layer 59, a protuberance layer 62 is formed to have a predetermined length dimension and disposed from the surface facing the recording medium toward the height direction (the Y direction shown in the drawing). Furthermore, a back gap layer 63 located at a predetermined distance in the height direction (the Y direction shown in the drawing) from the protuberance layer 62 is disposed on the lower core layer 59.

The protuberance layer 62 and the back gap layer 63 are formed from a magnetic material, and the protuberance layer 62 and the back gap layer 63 may be single-layers or be formed to have a multilayer laminated structure.

A coil insulating substrate layer 64 is disposed on the lower core layer 59 between the protuberance layer 62 and the back gap layer 63, and a plurality of first coil pieces 65 formed from an electrically conductive material are disposed on the coil insulating substrate layer 64.

The first coil pieces 65 are embedded in a coil insulating layer 66 formed from an inorganic insulating material, e.g., $Al_2O_3$, or an organic insulating material. As shown in FIG. 3B, the top surface of the protuberance layer 62, the top surface of the coil insulating layer 66, and the top surface of the back gap layer 63 are continuous flattened surface along the reference plane A shown in FIG. 3B.

A Gd-determining layer 68 is disposed from the location at a predetermined distance in the height direction (the Y direction shown in the drawing) from the surface facing the recording medium toward the height direction on the flattened surface of the protuberance layer 62 and the coil insulating layer 66.

A lower magnetic pole layer 69 and a gap layer 70 are disposed in that order from the bottom on the protuberance layer 62 between the surface facing the recording medium and the front end surface 68a of the Gd-determining layer 68, on the coil insulating layer 66 from the rear end surface 68b of the Gd-determining layer 68 toward the height direction, and on the back gap layer 63. The lower magnetic pole layer 69 and the gap layer 70 are formed through plating.

An upper magnetic pole layer 71 is disposed through plating on the gap layer 70 and the Gd-determining layer 68, and furthermore, an upper core layer 72 is disposed through plating on the upper magnetic pole layer 71.

An insulating layer 78 formed from an insulating material, e.g., a resist, is disposed on the upper core layer 72. Preferably, the insulating layer 78 is formed from an organic insulating material.

As shown in FIG. 3B, a plurality of second coil pieces 76 formed from an electrically conductive material are disposed on the insulating layer 78.

The end portions in the track-width direction of the first coil pieces 65 and the second coil pieces 76 are electrically connected with each other, forming a toroidal coil layer 77 configured from the first coil pieces 65 and the second coil pieces 76.

A protective layer 75 formed from an inorganic insulating material, e.g., $Al_2O_3$ or AlSiO, is disposed on the toroidal coil layer 77.

The gap layer 70 is formed from the NiPRe alloy through plating. The compositional ratio of the NiPRe alloy is within the range described with reference to FIG. 4 and FIG. 5. In this manner, the gap layer 70 can be formed, which exhibits corrosion resistance against an alkaline aqueous solution, which maintains the non-magnetic state even after a heat treatment is performed, and which can suppress the element diffusion at the interface to the lower magnetic pole layer 69 and the upper magnetic pole layer 71 during the heating.

The thin film magnetic head is not limited to have the structure shown in FIG. 1 to FIG. 3. The performance of the thin film magnetic head may be improved as long as the thin film magnetic head includes a magnetic pole portion, a magnetic circuit construction portion (composed of a core layer and a back gap layer) for leading a recording magnetic field to the magnetic pole portion, and a coil layer for inducing the recording magnetic field, while the magnetic pole portion is composed of at least a gap layer and an upper magnetic pole layer disposed on the gap layer.

Various experiments were conducted as described below. They are related to the ternary diagrams for the NiPRe alloys of FIG. 4 and FIG. 5. The experimental results of the etching rate with respect to an alkaline aqueous solution (detergent) will be described with reference to FIG. 6 and FIG. 7.

Figure 6:
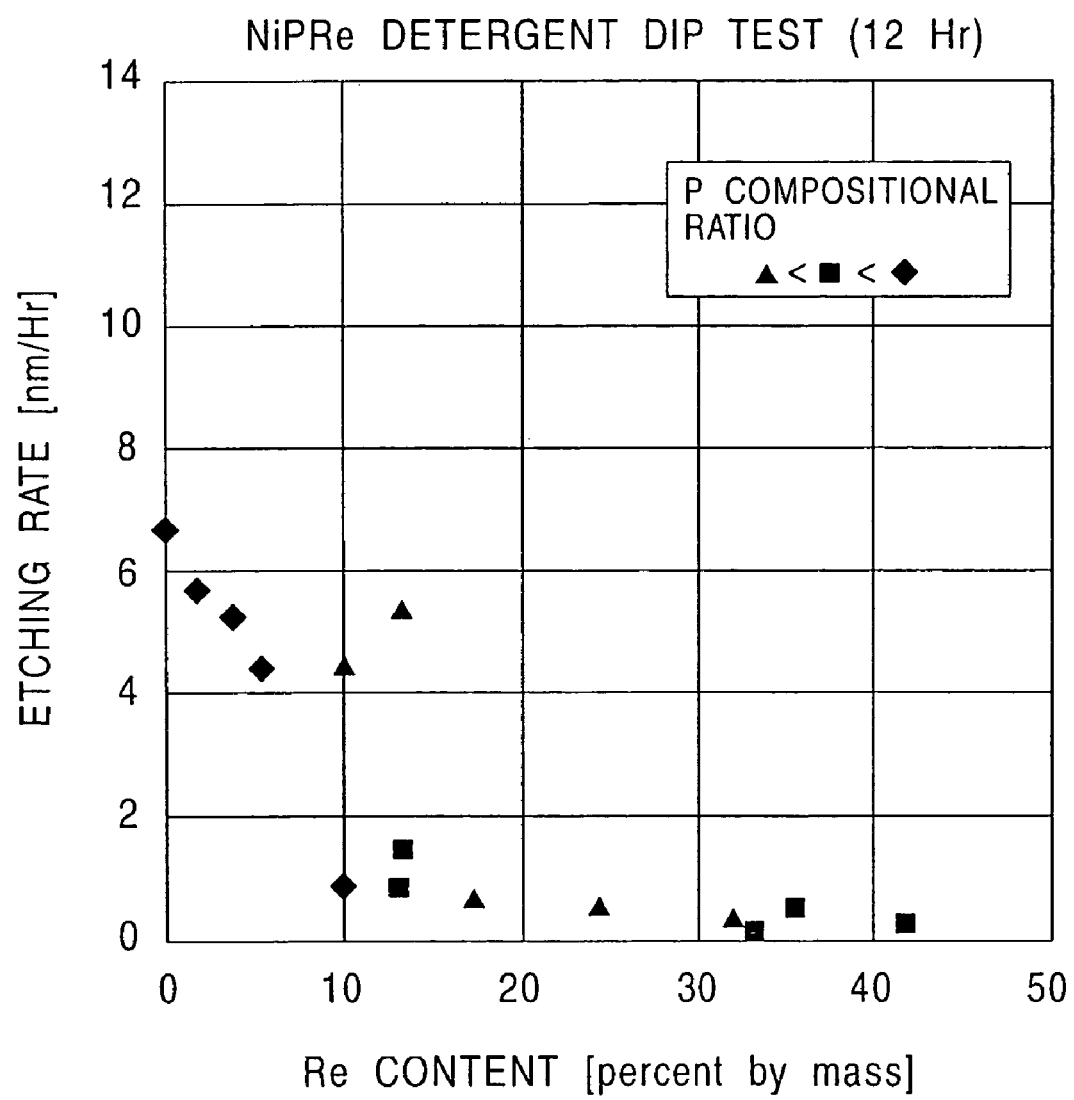
FIG. 6 is a graph showing the relationship between the compositional ratio of the element Re in a NiPRe alloy and the etching rate.

In the experiment, a solid film of NiPRe alloy was formed through plating. An aqueous solution composed of polyoxyethylene nonylphenyl ether and the like was used as the alkaline aqueous solution. The NiPRe alloy was immersed in this alkaline aqueous solution for 12 hours, and the degree of etching of the NiPRe alloy was measured while the compositional ratio of the element Re and the compositional ratio of the element P were changed. In FIG. 6, a triangle, a rectangle, and a rhombus, each showing an experimental point, are different in compositional ratio of the element P in the NiPRe alloy, and the element P increases in the order of triangle<rectangle<rhombus.

As shown in FIG. 6, when the content of the element P was at maximum (experimental points indicated by rhombuses), that when the element Re was contained even in small quantities, the etching rate was reduced compared with the etching rate in the case where the content of the element Re was 0 percent by mass.

The etching rate was reduced as the content of the element Re was increased, and the etching rate was reduced further as the content of the element P was also increased.

Figure 7:
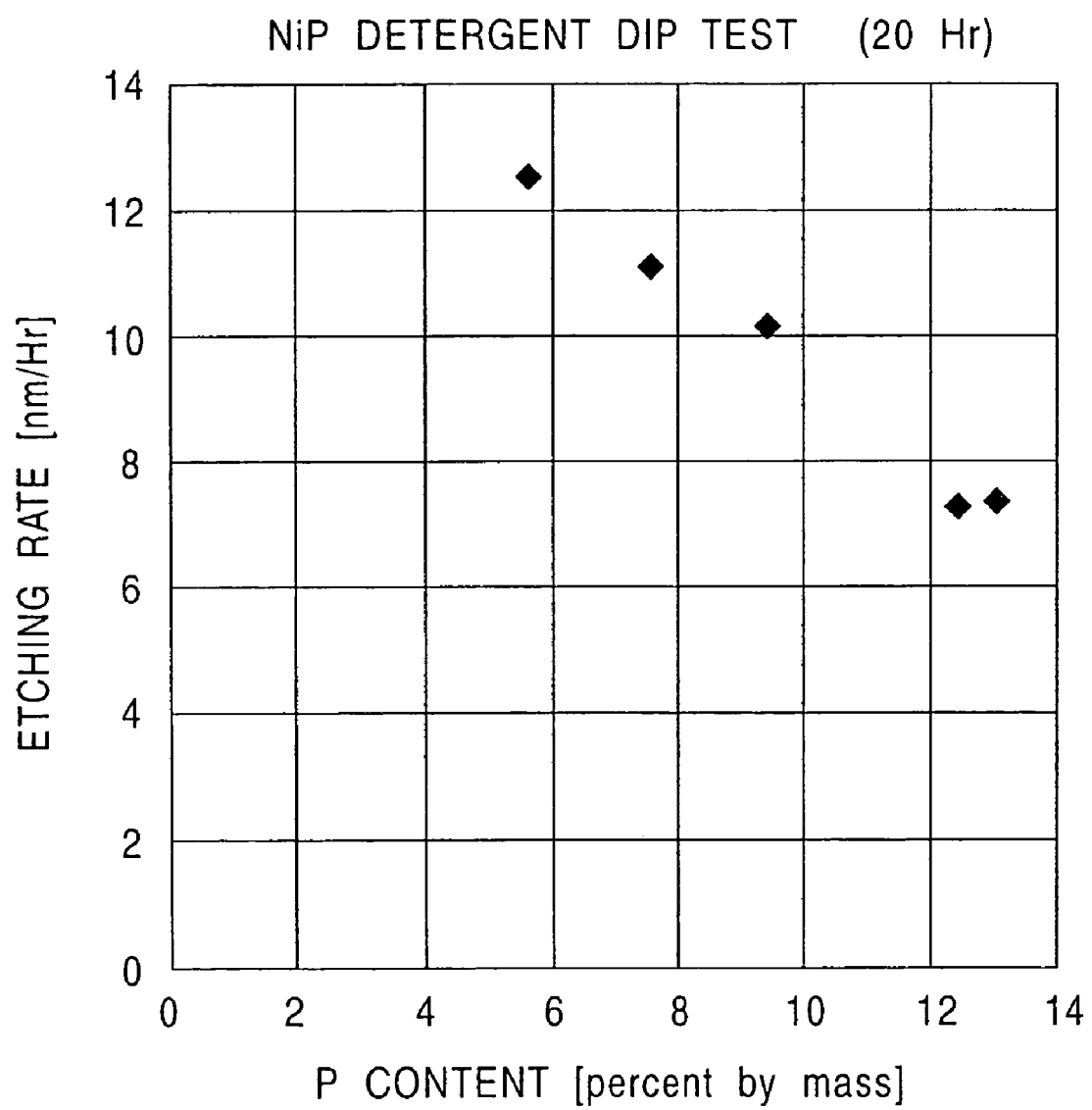
FIG. 7 is a graph showing the relationship between the compositional ratio of the element P in a NiP alloy and the etching rate.

FIG. 7 shows the experimental results of the etching rate of the NiP alloy. In the experiment, as in the case of FIG. 6, a solid film of NiP alloy was formed through plating, and an aqueous solution composed of polyoxyethylene nonylphenyl ether and the like was used as the alkaline aqueous solution. The NiP alloy was immersed in this alkaline aqueous solution for 20 hours, and the degree of etching of the NiP alloy was measured while the compositional ratio of the element P was changed. As shown in FIG. 7, the etching rate was reduced as the content of the element P was increased.

Figure 8:
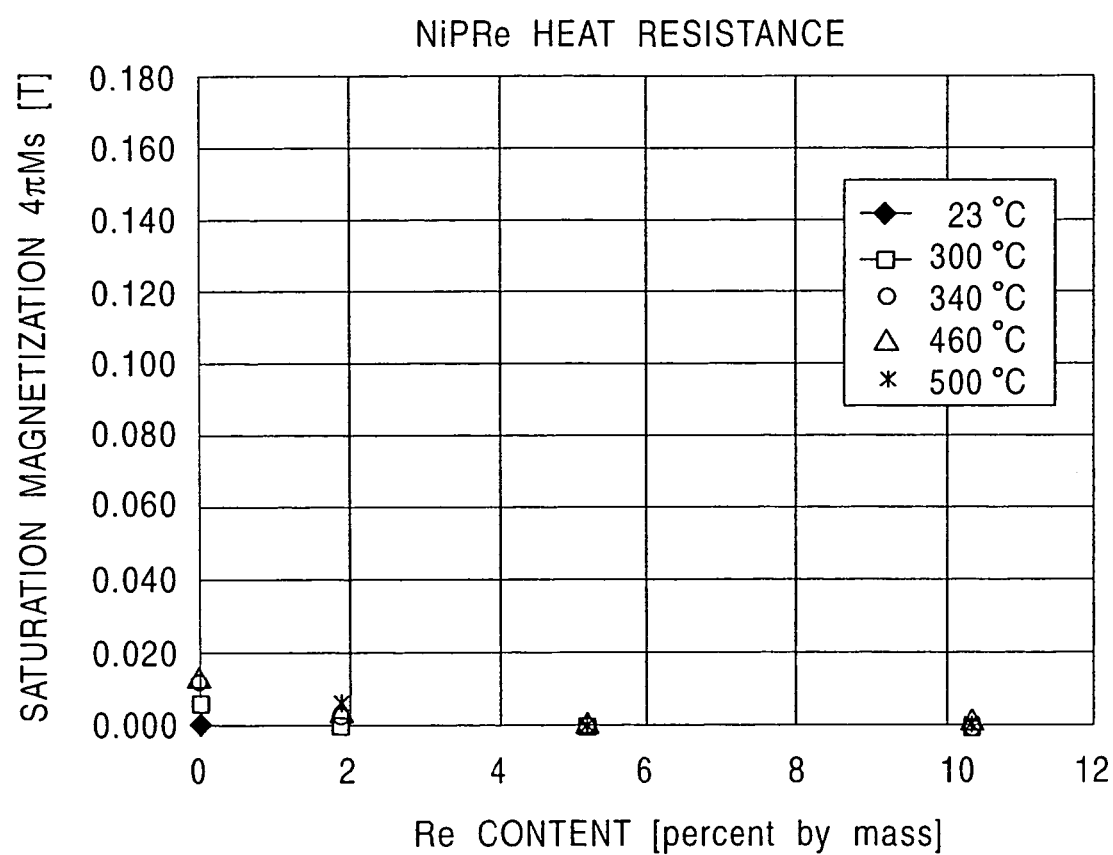
FIG. 8 is a graph showing the relationship between the compositional ratio of the element Re in a NiPRe alloy and the saturation magnetization with respect to the heating temperature.
Figure 9:
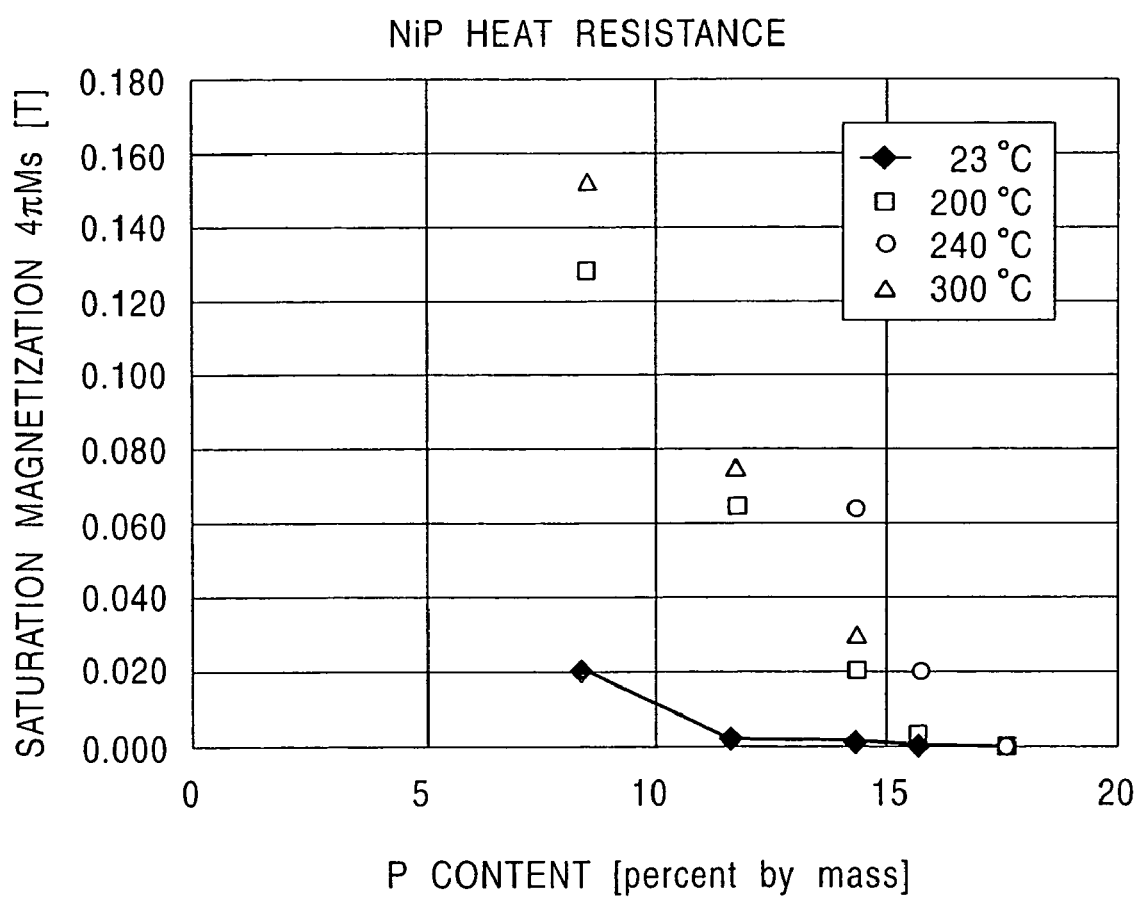
FIG. 9 is a graph showing the relationship between the compositional ratio of the element P in a NiP alloy and the saturation magnetization with respect to the heating temperature.

With respect to FIG. 8, the heat resistance of the NiPRe alloy was measured while the compositional ratio of the element Re was changed, and with respect to FIG. 9, the heat resistance of the NiP alloy was measured while the compositional ratio of the element P was changed.

As shown in FIG. 8, where the element Re was 0 percent by mass, that is the NiP alloy (the compositional ratio of the element P was 16.4 percent by mass), when the temperature was 23° C., the saturation magnetic flux density was 0 T and, therefore, a non-magnetic state was brought about, but when the heating temperature was raised to at least 300° C., the saturation magnetic flux density became larger than 0 T, and the magnetism was taken on.

On the other hand, where the element Re was 1.8 percent by mass (the element P was 15.8 percent by mass), the saturation magnetic flux density became slightly larger than 0 T when the heating was performed at about 340° C. and, therefore, the magnetism was taken on, but the saturation magnetic flux density was 0 T when the heating was performed at about 300° C. and, the non-magnetic state was brought about.

In the case where the element Re was 5.2 percent by mass (the element P was 15.8 percent by mass) and the element Re was 10.4 percent by mass (the element P was 14.6 percent by mass), the saturation magnetic flux density was 0 T even when the heating temperature was about 460° C. and, therefore, the non-magnetic state was brought about.

FIG. 9 shows the experimental results of the heat resistance with respect to the NiP alloy. In the case where the element P exceeds 15 percent by mass, the non-magnetic state was able to be maintained even when the heating temperature was raised to about 200° C.

From the experimental results shown in FIG. 8 and FIG. 9 that the NiPRe alloy had heat resistance superior to that of the NiP alloy, and in particular, when about 2 percent by weight of element Re was contained, the NiPRe alloy having heat resistance was able to be produced.

FIG. 10 to FIG. 13 show the experimental results for measurements of states of diffusion at the interface between the NiPRe alloy and the CoFe alloy in the non-heating state and after the heat treatment. All the photographs shown in FIGS. 10 to 13 are TEM (tunneling electron microscope) photographs.

In the experiment, a magnetic pole portion composed of three layers of a CoFe alloy/a NiPRe alloy/a CoFe alloy in that order from the bottom was formed through plating on a substrate. A TEM photograph of the state of the magnetic pole portion in the non-heating state was taken (the left diagram in each drawing). Subsequently, heating was performed at about 250° C., and a TEM photograph of the state after the heating was performed was taken (the right diagram in each drawing).

In addition to taking of the TEM photograph, the composition analysis was performed in each state. The results thereof are shown in FIG. 14 to FIG. 17. FIG. 14 shows the results of composition analysis corresponding to FIG. 10, FIG. 15 corresponds to FIG. 11, FIG. 16 corresponds to FIG. 12, and FIG. 17 corresponds to FIG. 13. With respect to the composition analysis, the measurement was performed by the use of EDS.

In each of the photographs shown in FIG. 10 to FIG. 13, a portion which appears to be highly dark is the NiPRe alloy layer.

Figure 10:
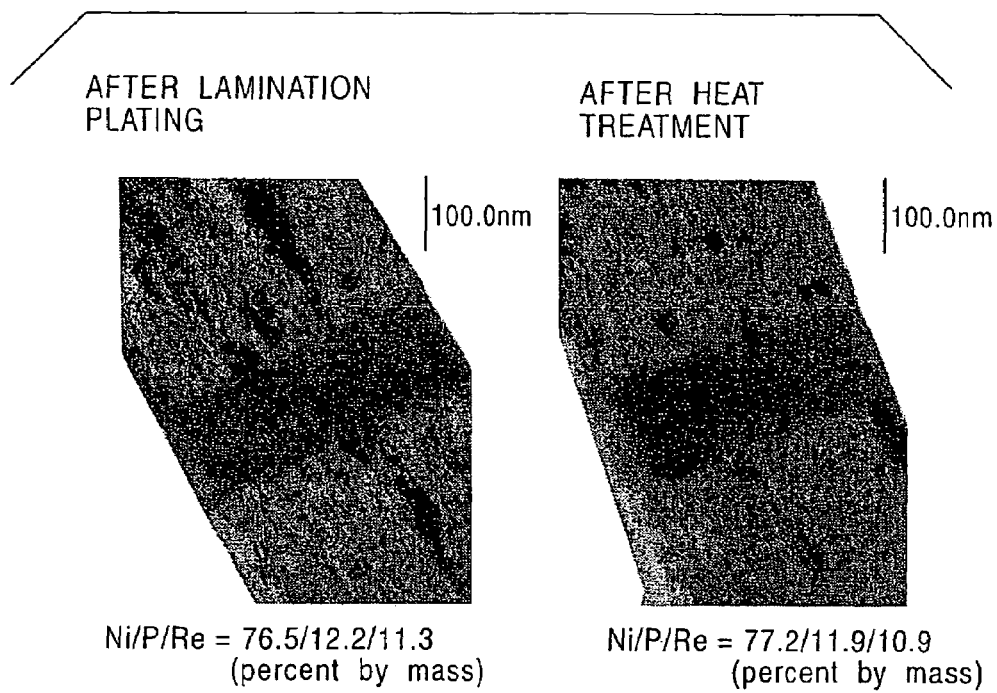
In FIG. 10, the left diagram is a TEM photograph taken immediately after the lamination of a CoFe alloy/a NiPRe (Ni: 76.5, P: 12.2, and Re: 11.3 on a percent by mass basis) alloy/a CoFe alloy in that order from the bottom (non-heating state), and the right diagram is a TEM photograph taken after the heating.

FIG. 10 shows the experimental result in which the compositional ratio of the NiPRe alloy was specified at Ni: 76.5, P: 12.2, and Re: 11.3 (each value is on a percent by mass basis, and the compositional ratio is measured just in the neighborhood of the center of the gap layer. Each of the compositional ratios is a compositional ratio in the non-heating state (the left diagram), and a slight change occurs in the compositional ratio by the heating (the right diagram)). It appears that minimal interface diffusion has occurred both in the non-heating state and even after the heating. With respect to the composition analysis performed, as shown in FIG. 14, all the elements of Ni, P, and Re are concentrated within a distance range of about 320 nm to about 430 nm from the substrate, while this range is believed to be the location and the range of the NiPRe alloy formed through plating, and apparently little difference in the element distribution is observed between the left diagram (in the non-heating state) in FIG. 14 and the right diagram (after the heating).

Figure 11:
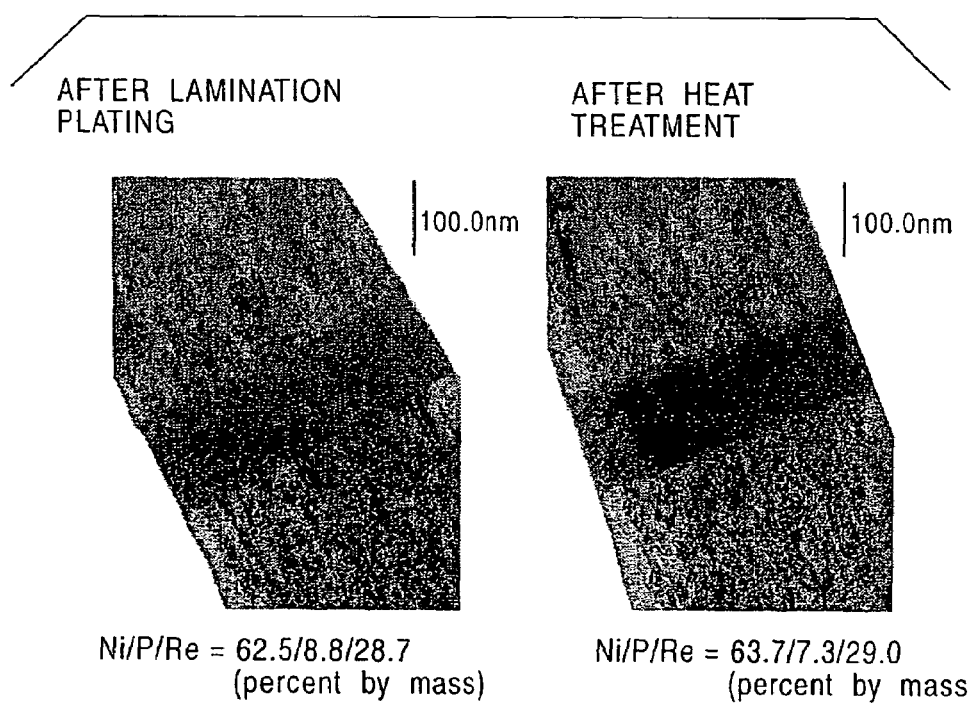
In FIG. 11, the left diagram is a TEM photograph taken immediately after the lamination of a CoFe alloy/a NiPRe (Ni: 62.5, P: 8.8, and Re: 28.7 on a percent by mass basis) alloy/a CoFe alloy in that order from the bottom (non-heating state), and the right diagram is a TEM photograph taken after the heating.

FIG. 11 shows the experimental result in which the compositional ratio of the NiPRe alloy was specified at Ni:

62.5, P: 8.8, and Re: 28.7 (each value is on a percent by mass basis, and the compositional ratio is measured just in the neighborhood of the center of the gap layer. Each of the compositional ratios is a compositional ratio in the non-heating state (the left diagram), and a slight change occurs in the compositional ratio by the heating (the right diagram)). It appears that minimal-interface diffusion has occurred both in the non-heating state and even after the heating. With respect to the composition analysis performed, as shown FIG. 15, all the elements of Ni, P, and Re are concentrated within a distance range of about 320 nm to about 430 nm from the substrate. This range is believed to be the location and the range of the NiPRe alloy formed through plating, and apparently little difference in the element distribution between the left diagram (in the non-heating state) in FIG. 15 and the right diagram (after the heating).

Figure 12:
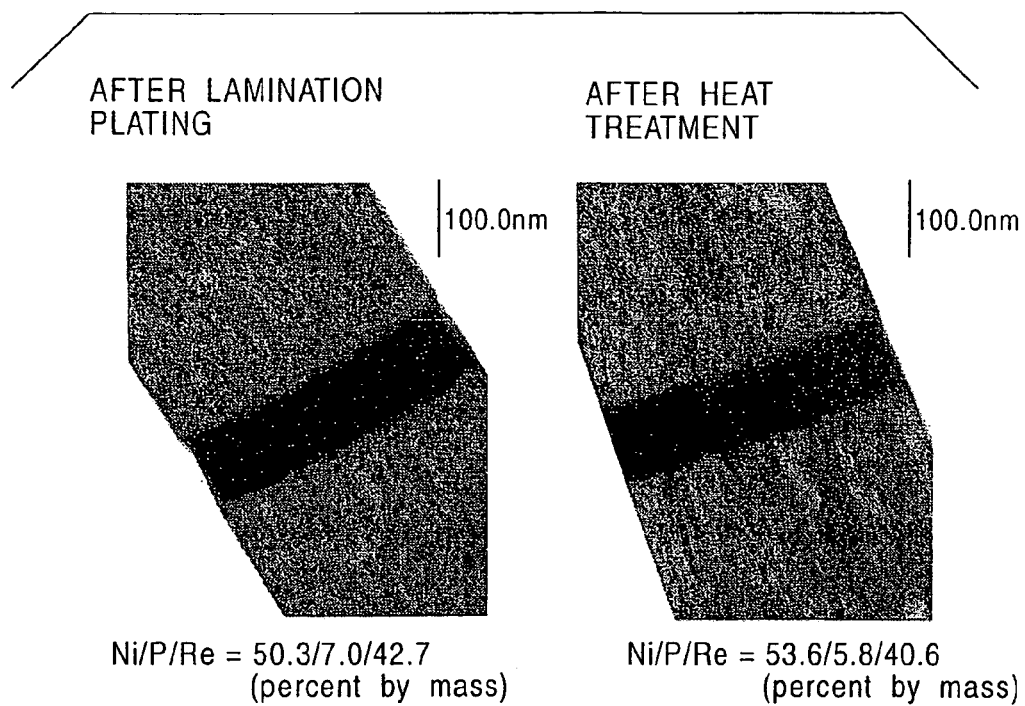
In FIG. 12, the left diagram is a TEM photograph taken immediately after the lamination of a CoFe alloy/a NiPRe (Ni: 50.3, P: 7.0, and Re: 42.7 on a percent by mass basis) alloy/a CoFe alloy in that order from the bottom (non-heating state), and the right diagram is a TEM photograph taken after the heating.

FIG. 12 shows an experimental result in which the compositional ratio of the NiPRe alloy was specified as Ni: 50.3, P: 7.0, and Re: 42.7 (each value is on a percent by mass basis, and the compositional ratio is measured just in the neighborhood of the center of the gap layer. Each of the compositional ratios is a compositional ratio in the non-heating state (the left diagram), and a slight change occurs in the compositional ratio by the heating (the right diagram)). It appears that minimal interface diffusion has occurred both in the non-heating state and even after the heating, but the interface between the CoFe alloy and the NiPRe alloy in the right diagram (in the heating state) in FIG. 12 may seem to be slightly blurred compared with that in FIG. 10 and FIG. 11.

Figure 16:
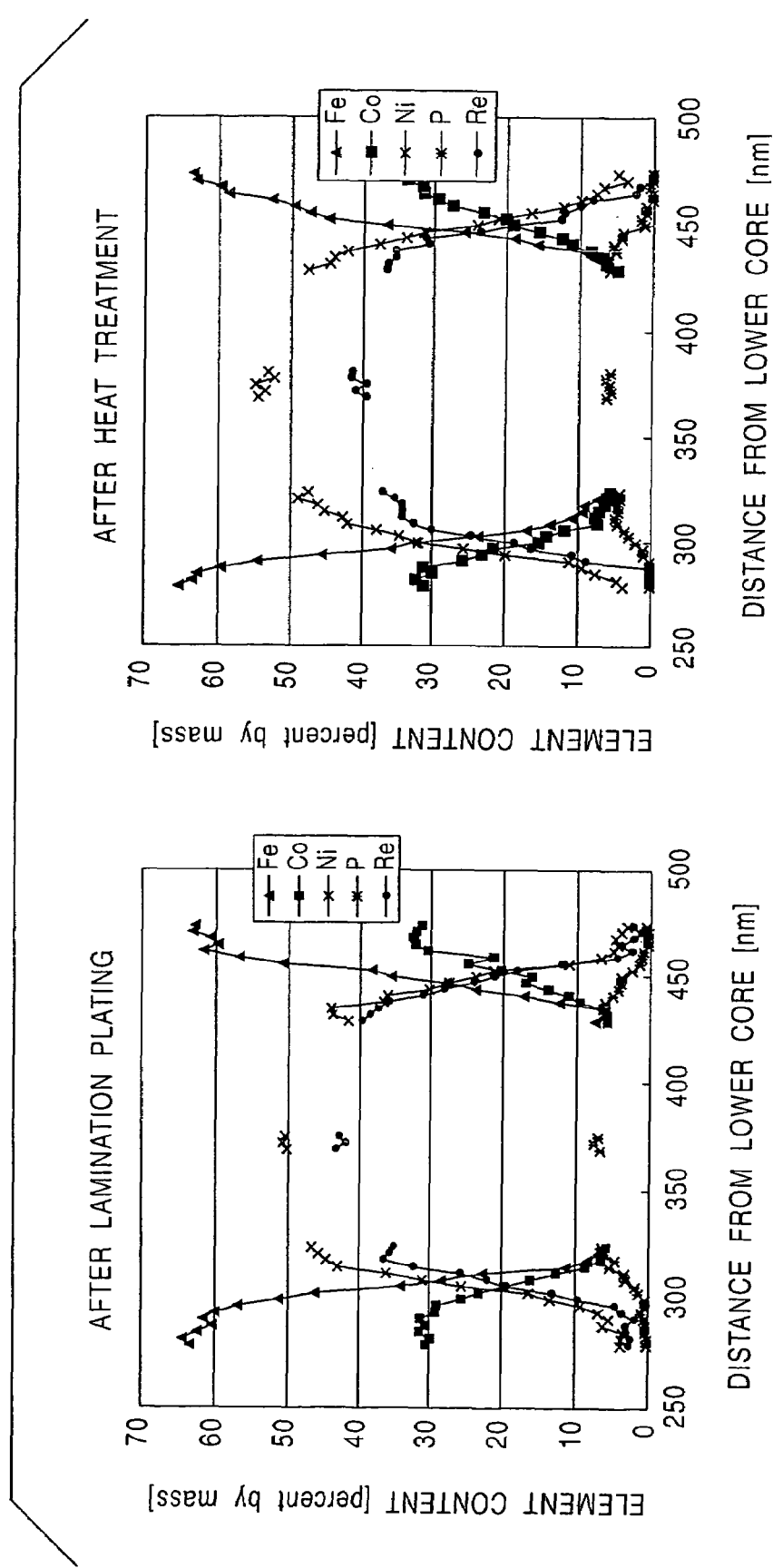
FIG. 16 shows graphs of the results of composition analysis corresponding to FIG. 12.

From FIG. 16 showing the composition analysis performed, all the elements of Ni, P, and Re are concentrated within a distance range of about 320 nm to about 430 nm from the substrate. This range is believed to be the location and the range of the NiPRe alloy formed through plating, and there is apparently little difference in the element distribution between the left diagram (in the non-heating state) in FIG. 16 and the right diagram (after the heating). Consequently, it is assumed that minimal interface diffusion has occurred.

Figure 13:
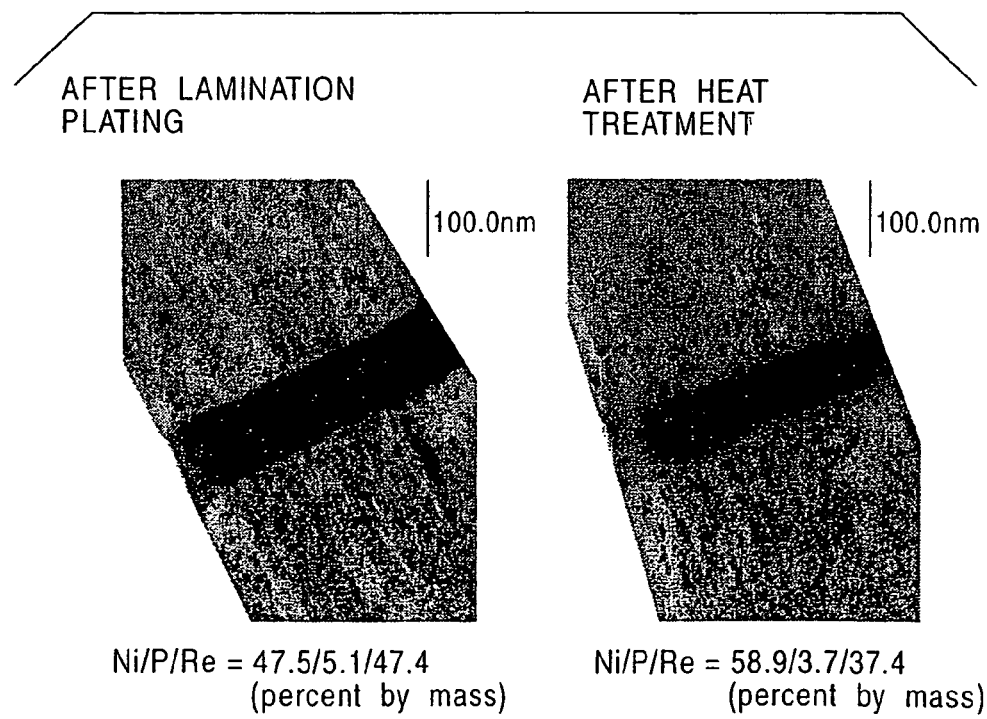
In FIG. 13, the left diagram is a TEM photograph taken immediately after the lamination of a CoFe alloy/a NiPRe (Ni: 47.5, P: 5.1, and Re: 47.4 on a percent by mass basis) alloy/a CoFe alloy in that order from the bottom (non-heating state), and the right diagram is a TEM photograph taken after the heating.
Figure 14:
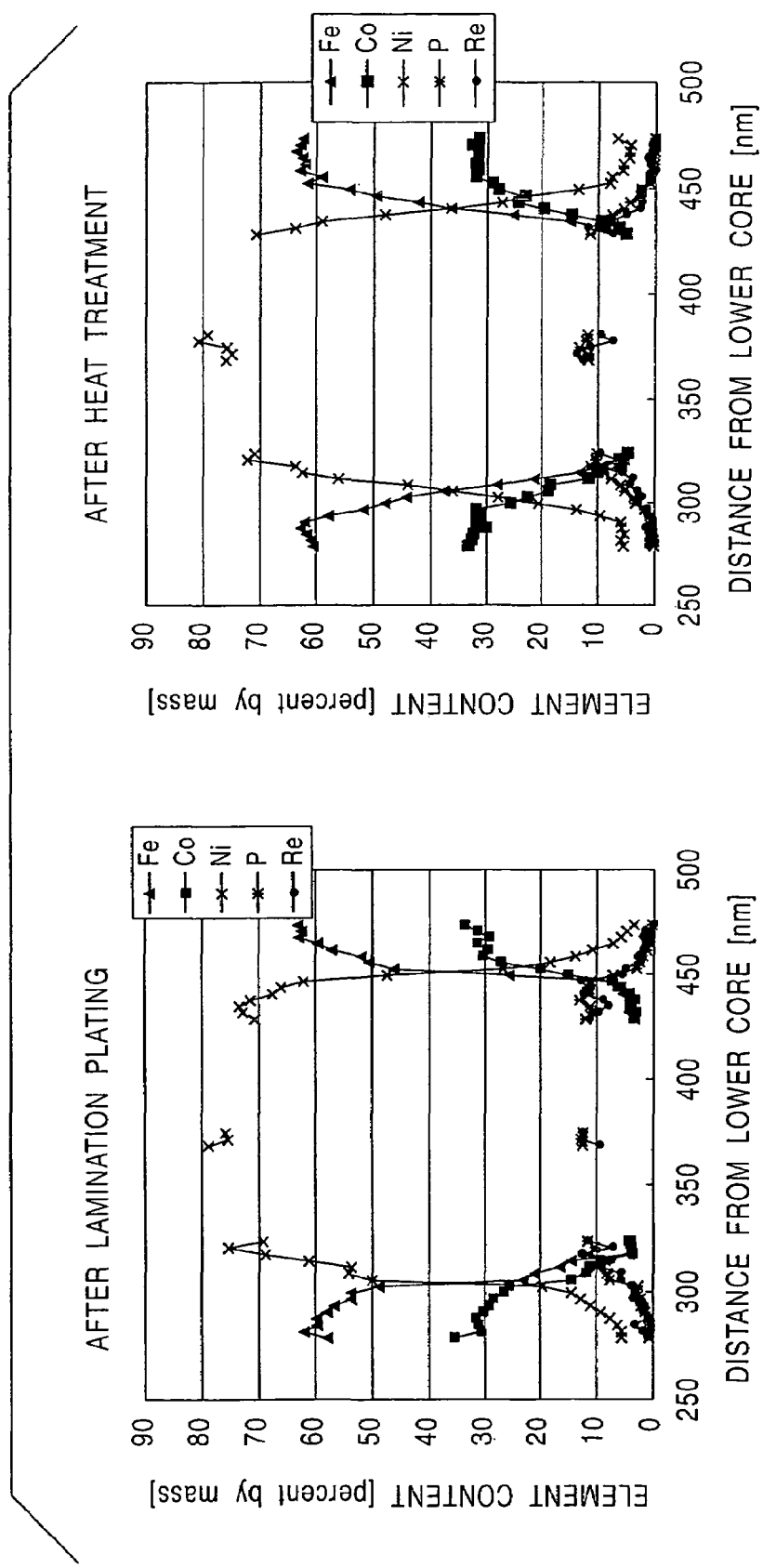
FIG. 14 shows graphs of the results of composition analysis corresponding to FIG. 10.
Figure 15:
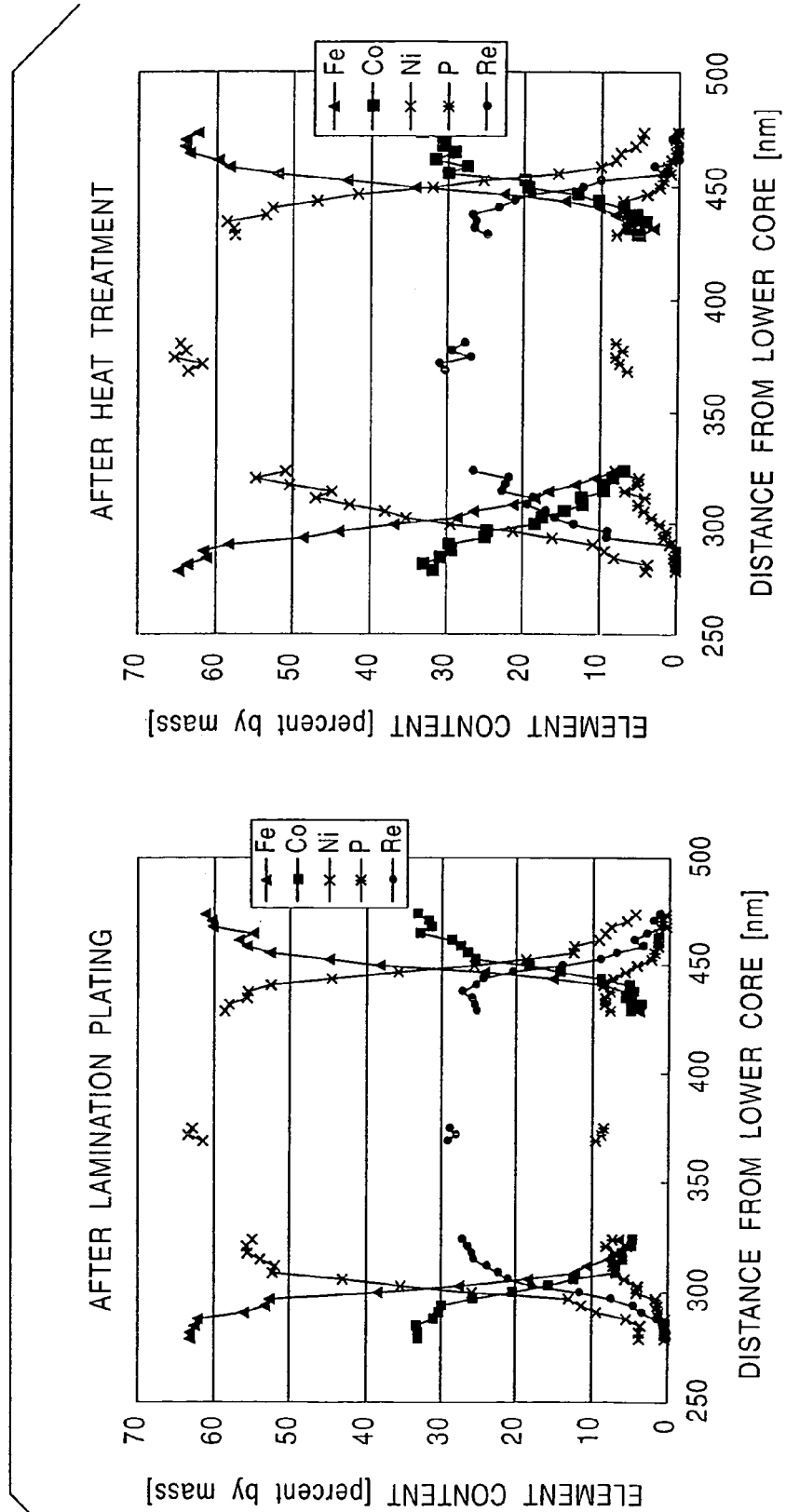
FIG. 15 shows graphs of the results of composition analysis corresponding to FIG. 11.

FIG. 13 shows an experimental result in which the compositional ratio of the NiPRe alloy was specified at Ni: 47.5, P: 5.1, and Re: 47.4 (each value is on a percent by mass basis, and the compositional ratio is measured just in the neighborhood of the center of the gap layer. Each of the compositional ratios is a compositional ratio in the non-heating state (the left diagram), and a slight change occurs in the compositional ratio by the heating (the right diagram)). The interface between the CoFe alloy and the NiPRe alloy in the right diagram (in the heating state) in FIG. 13 seems to be blurred compared with that in the left diagram (in the no-heating state). Consequently, it is assumed that interface diffusion has occurred.

Figure 17:
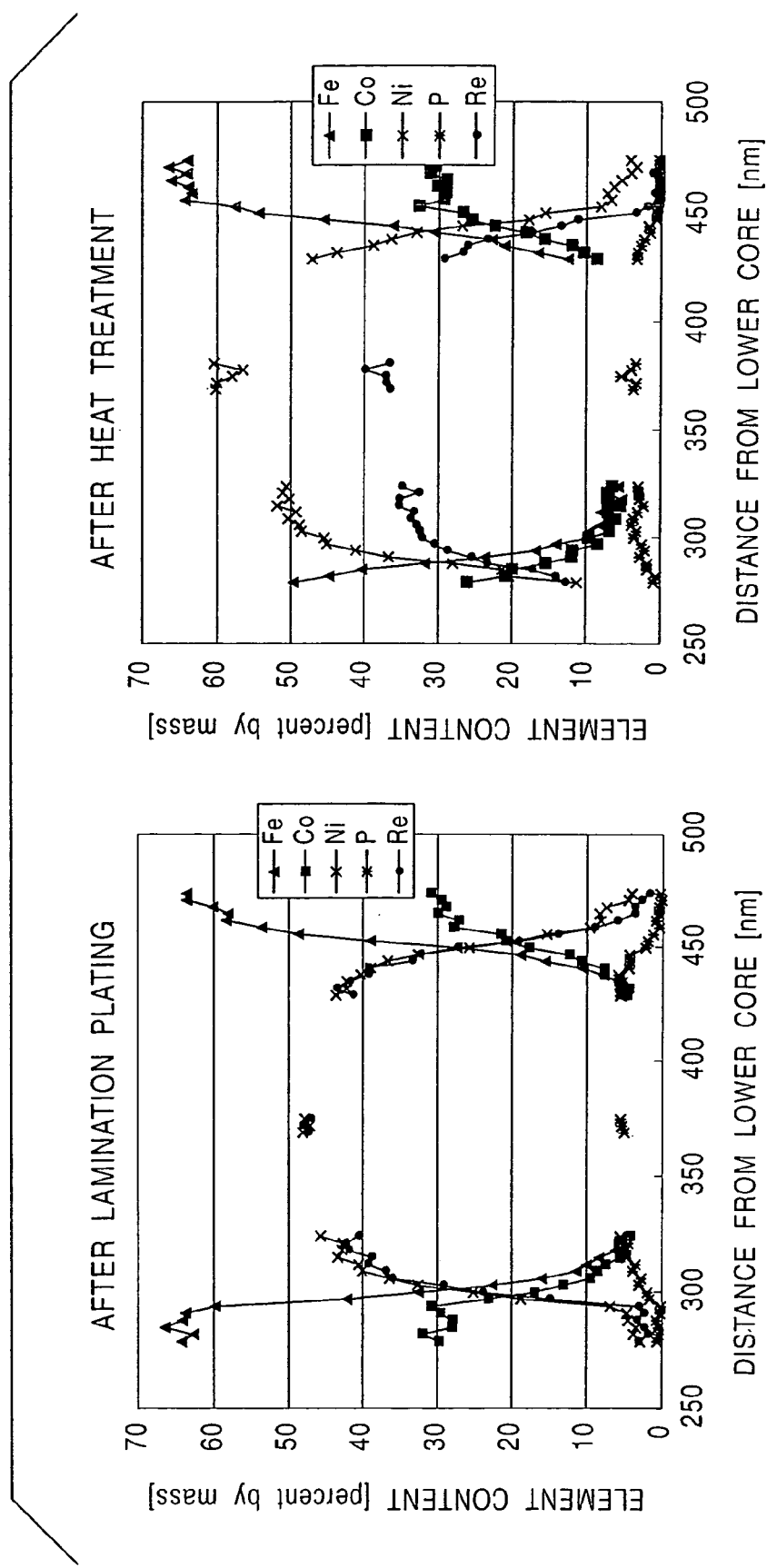
FIG. 17 shows graphs of the results of composition analysis corresponding to FIG. 13.
Figure 18:
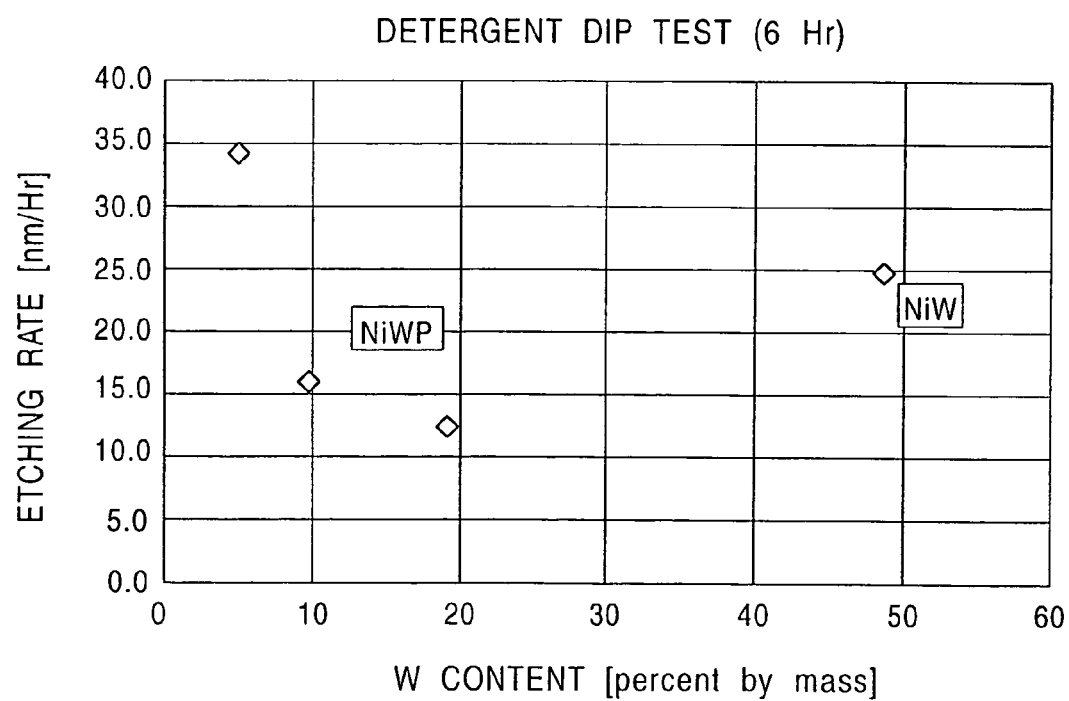
FIG. 18 is a graph showing the relationship between the compositional ratio of the element W in a NiPW alloy and a NiW alloy and the etching rate.

FIG. 17 show the result of the composition analysis performed, the element Re is decreased in the distance range of about 320 nm to about 430 nm from the substrate. This distance range of about 320 nm to about 430 nm is believed to be the location and the range of the NiPRe alloy formed through plating, in the right diagram (after the heating) in FIG. 17 compared with that in the left diagram (in the non-heating state), and the element Re, even in small quantities, diffuses over a wide range beyond this range. The element P appears to be distributed over a wide range in the right diagram in FIG. 17 compared with that in the left diagram.

In the experiments shown in FIG. 10 to FIG. 13, the compositional ratio of Re in FIG. 13 is the highest, and the compositional ratio of Re in FIG. 10 is the lowest. From these experimental results, if the content of the element Re becomes too large, interface diffusion appears to occur between the NiPRe alloy and magnetic layers (CoFe alloy) due to the heating.

The experimental results of etching rates with respect to the alkaline aqueous solution shown in FIG. 6 and FIG. 7 and the results of additional experimental points are indicated in the ternary diagram shown in FIG. 4.

Experimental results of the heat resistance shown in FIG. 8 and FIG. 9 and the results of additional experimental points are indicated in the ternary diagram shown in FIG. 5. The experimental point belonging to "as Plate" in the ternary diagram shown in FIG. 5 refers to a compositional ratio at which "magnetism" was taken on in a non-heating state. Likewise, experimental points belonging to "200° C.", "250° C.", and "300° C." in the ternary diagram refer to compositional ratios at which "magnetism" was taken on after heat treatments were performed at the respective temperatures. On the other hand, the experimental points belonging to "Over 300° C." in the ternary diagram refer to compositional ratios at which "magnetism" was not taken on and "non-magnetism" was exhibited after the heat treatment was performed at 300° C.

Linear boundary lines A bonding the point a (Ni:P:Re)= (84 percent by mass:16 percent by mass:0 percent by mass) and the point b (Ni:P:Re)=(72 percent by mass:0 percent by mass:28 percent by mass) were drawn in the ternary diagrams shown in FIG. 4 and FIG. 5.

In FIG. 4, experimental points at which the etching rate exceeds 10 nm/Hr are present in the compositional ratio region in the left side of this boundary line A. Since the etching rate of the NiP alloy readily exceeds 10 nm/Hr depending on the compositional ratio of the element P, the etching rate of the NiPRe alloy may be 10 nm/Hr or less.

In FIG. 5, experimental points at which the magnetism is taken on at 200° C. are present in the compositional ratio region in the left side of the boundary line A. Since the heating temperature of 200° C. may be the minimum temperature required to, for example, actually cure an organic insulating layer or the like in the manufacturing process of a thin film magnetic head, the non-magnetic state may be maintained even at a heating temperature of 200° C.

As shown in FIG. 4 and FIG. 5, in the compositional ratio range in the right side of the boundary line A, the etching rate with respect to the alkaline aqueous solution becomes less than 7 nm/Hr and, in addition, the non-magnetic state can be maintained even after a heat treatment is performed at 200° C., so that the corrosion resistance and the heat resistance may become superior to those of the NiP alloy.

The linear boundary line B shown in FIG. 4 and FIG. 5 is the line representing that the compositional ratio of the element Re is 2 percent by mass. When the compositional ratio of the element Re is at least 2 percent by mass, the heat resistance may be maintained, as described with reference to FIG. 8. In FIG. 4, when the element Re is at least 2 percent by mass, an etching rate of less than 7 nm/Hr may be achieved with respect to the alkaline aqueous solution.

The linear boundary line C shown in FIG. 4 and FIG. 5 is the line representing that a compositional ratio of the element Re 46 percent by mass. In the experimental results shown in FIG. 10 to FIG. 17, when the Re is 46 percent by mass or less, the element diffusion during the heating at the interface to the magnetic pole layer may be suppressed, effectively. In FIGS. 13 and 17, the element Re is 47.1 percent by mass in the NiPRe alloy immediately after the lamination (the left diagram). When the compositional ratio is approximately this value, the element diffusion occurs at the interface to the CoFe alloy (the right diagrams in FIG. 13 and FIG. 17) after the heating is performed. Therefore, the compositional ratio of the element Re is specified at 46 percent by mass or less.

The boundary line D shown in FIG. 4 and FIG. 5 is the portion at which the element P is 4 percent by mass. According to FIG. 7 and FIG. 9, the corrosion resistance and the heat resistance of the NiPRe alloy seems to be significantly reduced when the element P is reduced to about 4 percent by mass. In FIG. 4 and FIG. 5, the compositional ratio of the NiPRe alloy is within the compositional ratio range in the right side of the boundary line A and, therefore, the compositional ratio of the element Re is about 21 percent by mass at the intersection point of the boundary line A and the boundary line D. When such a compositional ratio of element Re is contained, as shown in the experimental results (FIGS. 6 8), the corrosion resistance and the heat resistance may be improved, the etching rate maintained at less than 7 nm/Hr, and the non-magnetic state may be maintained after a heat treatment is performed at 200° C. As shown in FIG. 4 and FIG. 5, the corrosion resistance and the heat resistance tend to be reduced slightly in the neighborhood of the intersection point of the boundary line A and the boundary line D compared with those in other compositional regions.

The boundary line E shown in FIG. 4 and FIG. 5 is the boundary line specifying an upper limit value of the element P. This boundary (the element P is 18 percent by mass or less) is a maximum value of the content of the element P in the NiPRe alloy, and it may be difficult to allow the NiPRe alloy to contain a greater content of the element P due to manufacturing limitations. Consequently, the maximum value of the element P is specified at 18 percent by mass or less.

In the present invention, the range enclosed by the boundary lines A to E is specified as the compositional range of Ni, P, and Re. Each of the boundary line is included in the compositional ratio according to the present invention.

In the present invention, it may be more effective to further limit the compositional ratio range enclosed by the boundary lines A to E, as described below.

In the ternary diagrams shown in FIG. 4 and FIG. 5, when the boundary line F (including the boundary line F) is defined as a straight line bonding the point c (Ni:P:Re)=(20 percent by mass:0 percent by mass:80 percent by mass) and the point d (Ni:P:Re)=(82 percent by mass:18 percent by mass:0 percent by mass), the compositional ratio of the NiPRe alloy is within the range enclosed by the boundary lines A, B, C, D, and F.

In FIG. 4, the experimental points (hollow circles) indicate that the etching rate is more than 0 nm/Hr and less than 1 nm/Hr obliquely extends almost linearly toward the upper-right direction in the ternary diagram. The boundary line F is drawn to pass just the right side of these experimental points. In the compositional range which is the compositional ratio region in the left side of the boundary line F (including the boundary line F) and which is enclosed by the boundary lines A, B, C, and D as well as the boundary line F, the etching rate with respect to the alkaline aqueous solution may be reduced further. The ternary diagram related to the heat resistance is shown in FIG. 5, within the range enclosed by the boundary lines A, B, C, D, and F, the non-magnetic state may be maintained even after a heat treatment is performed at about 200° C.

The compositional ratio of the element P may at least 8 percent by mass. That is, in the ternary diagrams shown in FIG. 4 and FIG. 5, the boundary line D (the line indicating that the compositional ratio of the element P is 4 percent by mass), which is one of the boundary lines regulating the range of the compositional ratio, is replaced with a boundary line G.

As shown in FIG. 7 and FIG. 9, when the content of the element P is at least 8 percent by mass in the NiP alloy, the corrosion resistance to the alkaline aqueous solution and the heat resistance may be improved compared with those in the case where the content of the element P is lower.

When the boundary line D, which is one of the boundary lines in the ternary diagram, is replaced with a boundary line G, as shown in FIG. 4, the experimental points at which the etching rate with respect to the alkaline aqueous solution is more than 6 nm/Hr and less than 7 nm/Hr are excluded and, thereby, the etching rate may be reduced to a value less than 6 nm/Hr.

As shown in FIG. 5, the experimental points at which the magnetism is taken on at 250° C. are excluded and, thereby, a NiPRe alloy can be produced, which may maintain the non-magnetic state even after a heat treatment is performed at about 300° C.

The compositional ratio of the element Re may be at least 10 percent by mass. That is, in the ternary diagrams shown in FIG. 4 and FIG. 5, the boundary line B (the line indicating that the compositional ratio of the element Re is 2 percent by mass), which is one of the boundary lines regulating the range of the compositional ratio, is replaced with a boundary line H.

From FIG. 6, when the compositional ratio of the element Re is at least 10 percent by mass, the etching rate may be reduced.

When the boundary line B, which is one of the boundary lines in the ternary diagram, is replaced with a boundary line H. From FIG. 4, the majority of the experimental points at which the etching rate is more than 4 nm/Hr and less than 6 nm/Hr are not included within the range of the compositional ratio of the NiPRe alloy and, the chemical agent resistance against the alkaline aqueous solution may be improved.

The compositional ratio of the element Re may be 30 percent by mass or less. That is, in the ternary diagrams shown in FIG. 4 and FIG. 5, the boundary line C (the line indicating that the compositional ratio of the element Re is 46 percent by mass), which is one of the boundary lines regulating the range of the compositional ratio, is replaced with a boundary line I.

According to the experimental results shown in FIG. 10 to FIG. 17, even when the compositional ratio of the element Re in the NiPRe alloy is 42.7 percent by mass in the non-heating state, as in the experiment shown in FIG. 12, the alloy is resistant to interface diffusion during the heating. In order to further suppress the interface diffusion, the compositional ratio of the element Re in the NiPRe alloy may be reduced to about 28.7 percent by mass, similarly to the experimental result shown in FIG. 11. Consequently, a compositional ratio of the element Re may be specified at 30 percent by mass or less.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. A thin film magnetic head having a gap layer comprising:
a NiPRe alloy having compositional ratios within the range enclosed in a NiPRe ternary diagram by:
a linear boundary line A (including the boundary line A) joining:
a point a where (Ni:P:Re)=(84 percent by mass:16 percent by mass:0 percent by mass) and
a point b where (Ni:P:Re)=(72 percent by mass:0 percent by mass:28 percent by mass);
a linear boundary line B (including the boundary line B) representing a compositional ratio of Re that is 2 percent by mass;
a linear boundary line C (including the boundary line C) representing a compositional ratio of Re that is 46 percent by mass;
a linear boundary line D (including the boundary line D) representing a compositional ratio of P that is 4 percent by mass; and
a linear boundary line E (including the boundary line E) representing a compositional ratio of P that is 18 percent by mass.

2. The thin film magnetic head according to claim 1, wherein the NiPRe ternary diagram has a boundary line F (including the boundary line F) defined as a straight line joining:
the point c where (Ni:P:Re)=(20 percent by mass:0 percent by mass:80 percent by mass) and
the point d where (Ni:P:Re)=(82 percent by mass:18 percent by mass:0 percent by mass), and
wherein the compositional ratio of the NiPRe alloy is within the range enclosed by the boundary lines A, B, C, D, and F.

3. The thin film magnetic head according to claim 1, wherein the compositional ratio of the element P is at least 8 percent by mass.

4. The thin film magnetic head according to claim 1, wherein the compositional ratio of the element Re is at least 10 percent by mass.

5. The thin film magnetic head according to claim 1, wherein the compositional ratio of the element Re is 30 percent by mass or less.

6. The thin film magnetic head according to claim 1, wherein the gap layer is formed by plating.

7. A thin film magnetic head having a gap layer comprising;
a NiPRe alloy, having compositions of Ni, P and Re such that the gap layer remains non-magnetic after heat treatment at at least 200° C.

8. The thin film magnetic head according to claim 7, wherein the heat treatment temperature is at least 250° C.

9. The thin film magnetic head according to claim 7, wherein the heat treatment temperature is at least 300° C.

10. The thin film magnetic head according to claim 7, wherein the compositions of Ni, P and Re are selected such that the etching rate is less than 7 nm/hr.

11. A thin film magnetic head comprising:
a magnetic pole portion, the magnetic pole portion having at least a gap layer and an upper magnetic pole portion disposed on the gap layer;
a magnetic circuit construction portion; and
a coil layer,
wherein the gap layer contains a NiPRe alloy.

12. The thin film magnetic head according to claim 11, wherein the NiPRe alloy has compositional ratios within the range enclosed in a NiPRe ternary diagram by:
a linear boundary line A (including the boundary line A) joining:
a point a where (Ni:P:Re)=(84 percent by mass:16 percent by mass:0 percent by mass) and
a point b where (Ni:P:Re)=(72 percent by mass:0 percent by mass:28 percent by mass);
a linear boundary line B (including the boundary line B) representing a compositional ratio of Re that is 2 percent by mass;
a linear boundary line C (including the boundary line C) representing a compositional ratio of Re that is is 46 percent by mass;
a linear boundary line D (including the boundary line D) representing a compositional ratio of P that is 4 percent by mass; and
a linear boundary line E (including the boundary line E) representing a compositional ratio of P that is 18 percent by mass.

13. A magnetic recording-reproducing head comprising:
a magnetic reproducing head;
a lower magnetic core layer;
a lower magnetic pole layer;
a gap layer; and
an upper magnetic pole layer,
wherein the gap layer comprises a NiPRe alloy.

14. The magnetic recording-reproducing head in accordance with claim 13, wherein the gap layer is formed by plating.

15. The magnetic recording-reproducing head according to claim 13, wherein the NiPRe alloy has compositional ratios within the range enclosed in a NiPRE ternary diagram by:
a linear boundary line A (including the boundary line A) joining:
a point a where (Ni:P:Re)=(84 percent by mass:16 percent by mass:0 percent by mass) and
a point b where (Ni:P:Re)=(72 percent by mass:0 percent by mass:28 percent by mass);
a linear boundary line B (including the boundary line B) representing a compositional ratio of Re that is 2 percent by mass;
a linear boundary line C (including the boundary line C) representing a compositional ratio of Re that is is 46 percent by mass;
a linear boundary line D (including the boundary line D) representing a compositional ratio of P that is 4 percent by mass; and
a linear boundary line E (including the boundary line E) representing a compositional ratio of P that is 18 percent by mass.

16. The magnetic recording-reproducing head according to claim 13, wherein compositions of Ni, P and Re are such that the gap layer remains non-magnetic after heat treatment at at least 200° C.

17. The magnetic recording-reproducing head according to claim 16, wherein the heat treatment temperature is at least 250° C.

18. The thin film magnetic head according to claim 17, wherein the heat treatment temperature is at least 300° C.

19. The thin film magnetic head according to claim 16, wherein the compositions of Ni, P and Re are selected such that the etching rate is less than 7 nm/hr.

20. A magnetic head assembly comprising:
a slider;
a reproducing head;
a recording head comprising:
a magnetic reproducing head;
a lower magnetic core layer;
a lower magnetic pole layer;
a gap layer; and
an upper magnetic pole layer,
wherein the gap layer contains a NiPRe alloy.

\* \* \* \* \*

UNITED STATES PATENT AND TRADEMARK OFFICE
CERTIFICATE OF CORRECTION

PATENT NO.         : 7,359,148 B2
APPLICATION NO.    : 10/916029
DATED              : April 15, 2008
INVENTOR(S)        : Hisayuki Yazawa It is certified that error appears in the above-identified patent and that said Letters Patent is hereby corrected as shown below:

In columns 17-18, in claim 12, line 14, after "ratio of Re that" delete "is" (second occurrence).

In column 18, in claim 15, line 3, after "enclosed in a" delete "NiPRE" and substitute --NiPRe-- in its place.

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

PATENT NO.        : 7,359,148 B2  
APPLICATION NO.   : 10/916029  
DATED             : April 15, 2008  
INVENTOR(S)       : Hisayuki Yazawa Page 1 of 1

It is certified that error appears in the above-identified patent and that said Letters Patent is hereby corrected as shown below:

In column 18, in claim 12, line 9, after "ratio of Re that" delete "is" (second occurrence).

In column 18, in claim 15, line 28, after "enclosed in a" delete "NiPRE" and substitute --NiPRe-- in its place.

This certificate supersedes the Certificate of Correction issued November 4, 2008.

Signed and Sealed this

Twenty-fifth Day of November, 2008

JON W. DUDAS  
*Director of the United States Patent and Trademark Office*